US011785356B2

(12) United States Patent
Kobayashi

(10) Patent No.: US 11,785,356 B2
(45) Date of Patent: *Oct. 10, 2023

(54) PHOTOELECTRIC CONVERSION DEVICE WITH MASK CIRCUITS

(71) Applicant: CANON KABUSHIKI KAISHA, Tokyo (JP)

(72) Inventor: Masahiro Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/490,023

(22) Filed: Sep. 30, 2021

(65) Prior Publication Data
US 2022/0021827 A1 Jan. 20, 2022

Related U.S. Application Data

(63) Continuation of application No. 16/568,423, filed on Sep. 12, 2019, now Pat. No. 11,165,976.

(30) Foreign Application Priority Data

Sep. 21, 2018 (JP) ................. 2018-178080

(51) Int. Cl.
H04N 25/533 (2023.01)
H04N 25/59 (2023.01)
(Continued)

(52) U.S. Cl.
CPC ......... H04N 25/533 (2023.01); H04N 25/583 (2023.01); H04N 25/59 (2023.01);
(Continued)

(58) Field of Classification Search
CPC ........ H04N 5/3535–3537; H04N 5/376–3765; H04N 5/379; H04N 5/35554;
(Continued)

(56) References Cited

U.S. PATENT DOCUMENTS 8,045,034 B2 10/2011 Shibata et al.
8,208,053 B2 6/2012 Nishihara
(Continued)

FOREIGN PATENT DOCUMENTS

CN 102037722 A 4/2011
CN 106899814 A 6/2017
(Continued)

OTHER PUBLICATIONS

Office Action dated Mar. 3, 2022, in Chinese Patent Application No. 201910889615.7.
(Continued)

Primary Examiner — Paul M Berardesca
(74) Attorney, Agent, or Firm — Venable LLP

(57) ABSTRACT

Photoelectric conversion device includes first substrate having blocks each including photoelectric converters, and second substrate having at least part of processing circuit for reading out signals from the photoelectric converters. The processing circuit drives driving signal lines for driving the photoelectric converters. The driving signal lines include first signal lines each arranged in the first substrate and commonly assigned to at least two blocks arranged in row direction of the blocks and second signal lines each individually assigned to one block of the blocks. The processing circuit includes transmission lines and selection circuits each corresponding to one second signal line of the second signal lines. Each selection circuit selects one driving signal from driving signals supplied to the transmission lines, and supplies the selected driving signal to the corresponding second signal line of the second signal lines.

22 Claims, 26 Drawing Sheets

(51) Int. Cl.
  *H04N 25/79* (2023.01)
  *H04N 25/767* (2023.01)
  *H04N 25/772* (2023.01)
  *H04N 25/779* (2023.01)
  *H04N 25/583* (2023.01)

(52) U.S. Cl.
  CPC ......... *H04N 25/767* (2023.01); *H04N 25/772* (2023.01); *H04N 25/779* (2023.01); *H04N 25/79* (2023.01)

(58) Field of Classification Search
  CPC ............. H04N 5/35563; H04N 5/3559; H04N 5/37455; H04N 25/533; H04N 25/534; H04N 25/583; H04N 25/585; H04N 25/59; H04N 25/74; H04N 25/745; H04N 25/79; H01L 27/14634–14638
  See application file for complete search history.

(56) References Cited

U.S. PATENT DOCUMENTS

| | | | |
|---|---|---|---|
| 8,455,809 B2 | 6/2013 | Kudo | |
| 8,742,310 B2 | 6/2014 | Guezzi et al. | |
| 8,772,694 B2 | 7/2014 | Sugano et al. | |
| 8,884,391 B2 | 11/2014 | Fudaba et al. | |
| 9,147,708 B2 | 9/2015 | Okita et al. | |
| 9,153,610 B2 | 10/2015 | Kobayashi et al. | |
| 9,571,767 B2 | 2/2017 | Tsunai | |
| 9,768,213 B2 | 9/2017 | Soda et al. | |
| 9,876,975 B2 | 1/2018 | Yoshida et al. | |
| 10,021,331 B2 | 7/2018 | Sakakibara et al. | |
| 10,348,992 B2 | 7/2019 | Sakakibara et al. | |
| 10,412,327 B2 | 9/2019 | Takahashi | |
| 10,645,313 B2 | 5/2020 | Takahashi | |
| 10,944,932 B2 | 3/2021 | Sakakibara et al. | |
| 11,165,976 B2 | 11/2021 | Kobayashi | |
| 2004/0251394 A1 | 12/2004 | Rhodes et al. | |
| 2009/0140122 A1 | 6/2009 | Suzuki | |
| 2010/0007780 A1 | 1/2010 | Nishihara | |
| 2013/0119233 A1* | 5/2013 | Guezzi | H01L 27/14634 250/208.1 |
| 2018/0115724 A1 | 4/2018 | Motonaga | |
| 2018/0227514 A1 | 8/2018 | Takahashi | |
| 2018/0374886 A1 | 12/2018 | Iwata et al. | |
| 2019/0037161 A1 | 1/2019 | Ikeda et al. | |
| 2019/0103427 A1 | 4/2019 | Matsumoto et al. | |
| 2019/0246054 A1 | 8/2019 | Kobayashi et al. | |
| 2019/0387189 A1 | 12/2019 | Kobayashi | |
| 2020/0014871 A1 | 1/2020 | Matsumoto et al. | |
| 2020/0068147 A1 | 1/2020 | Hayashi et al. | |
| 2020/0389615 A1 | 12/2020 | Sakakibara et al. | |

FOREIGN PATENT DOCUMENTS

| | | |
|---|---|---|
| CN | 107925730 A | 4/2018 |
| EP | 2280536 A1 | 2/2011 |
| EP | 2833620 A1 | 2/2015 |
| EP | 3468168 A1 | 4/2019 |
| JP | 2006-148284 A | 6/2006 |
| JP | 2010-021697 A | 1/2010 |
| JP | 2012-100219 A | 5/2012 |
| JP | 2012-151847 A | 8/2012 |
| JP | 2013-026896 A | 2/2013 |
| WO | 2017-119166 A1 | 7/2017 |
| WO | 2017/208638 A1 | 12/2017 |

OTHER PUBLICATIONS

Search Report dated Dec. 5, 2019, in European Patent Application No. 19195848.7.

* cited by examiner

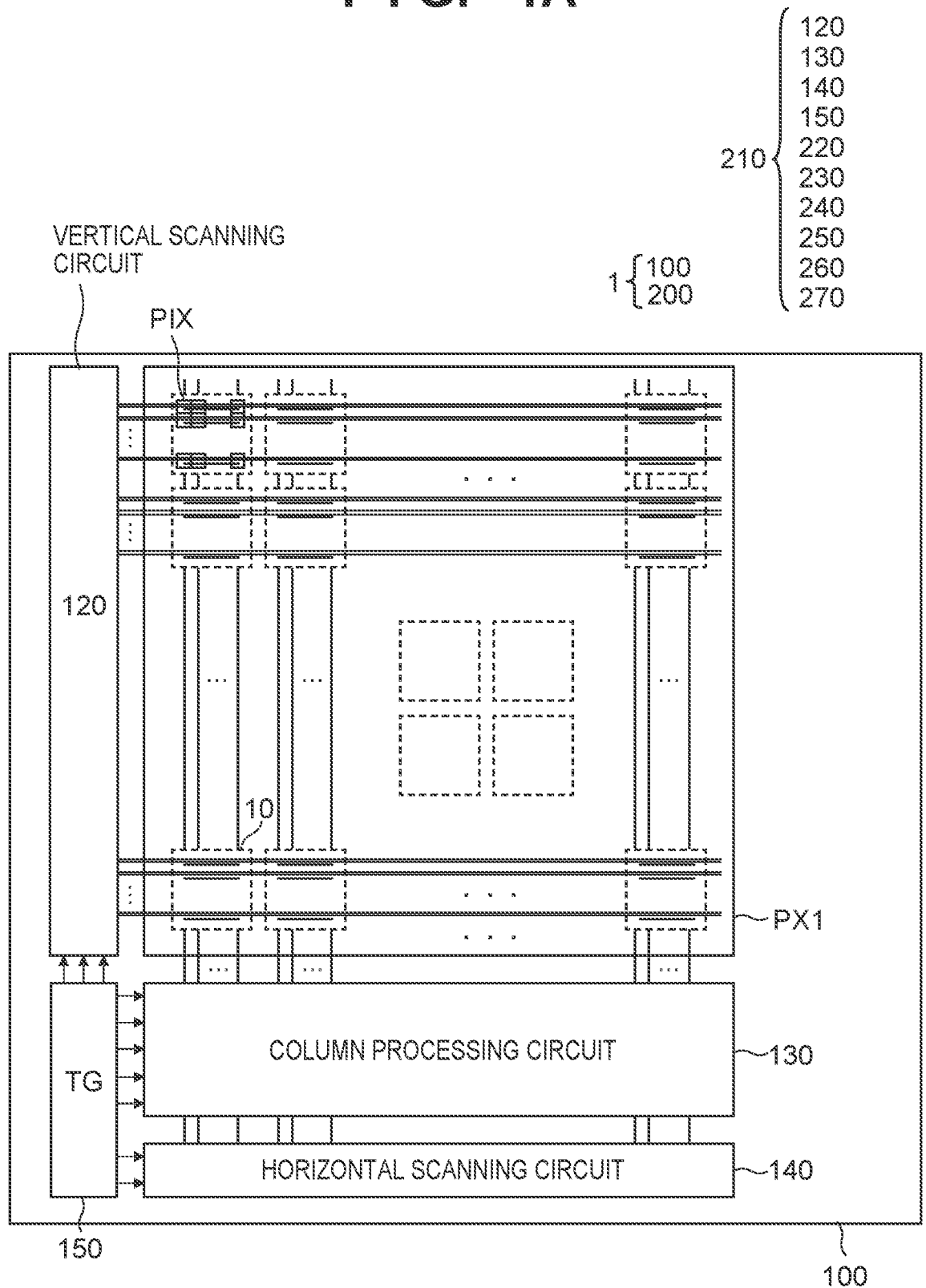

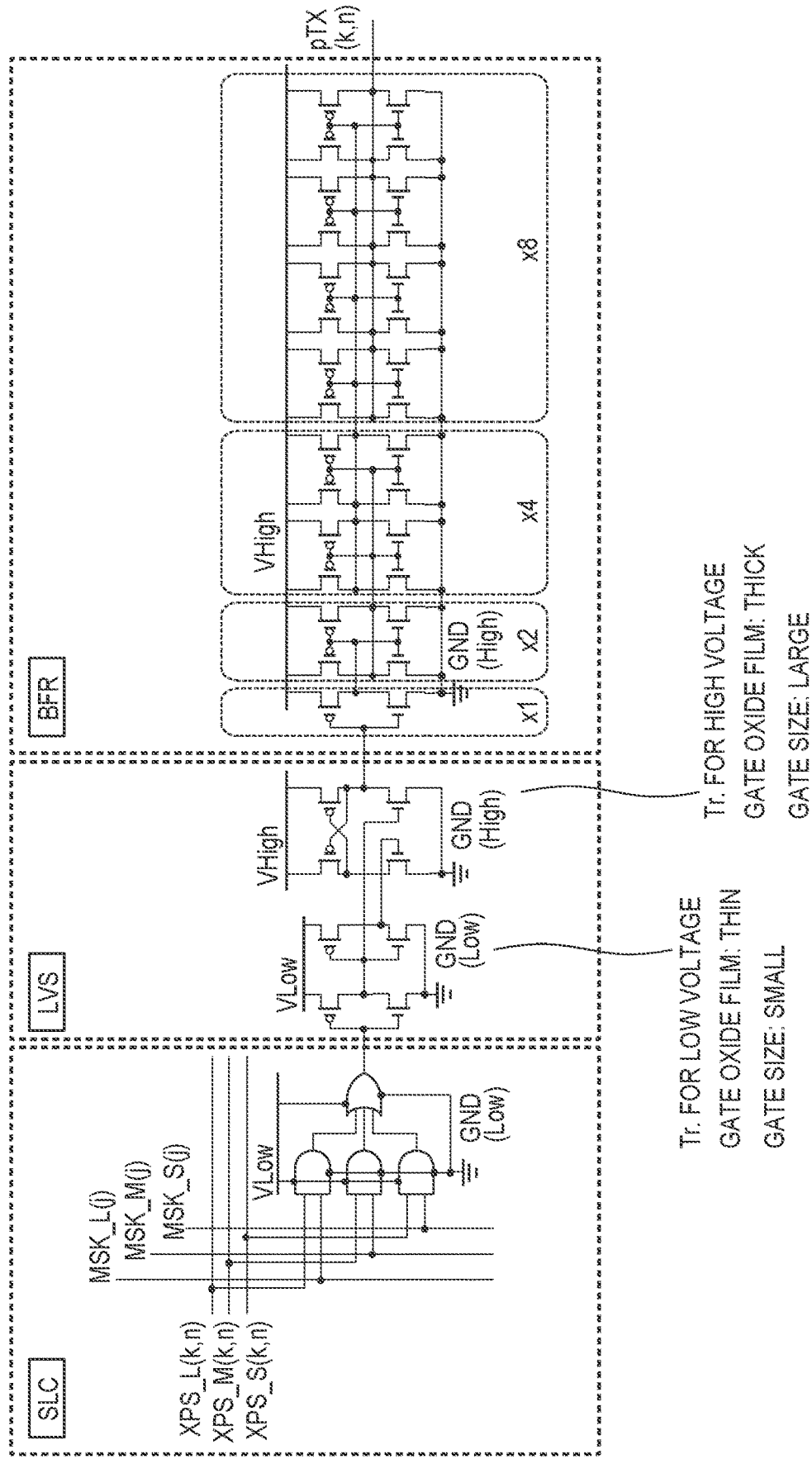

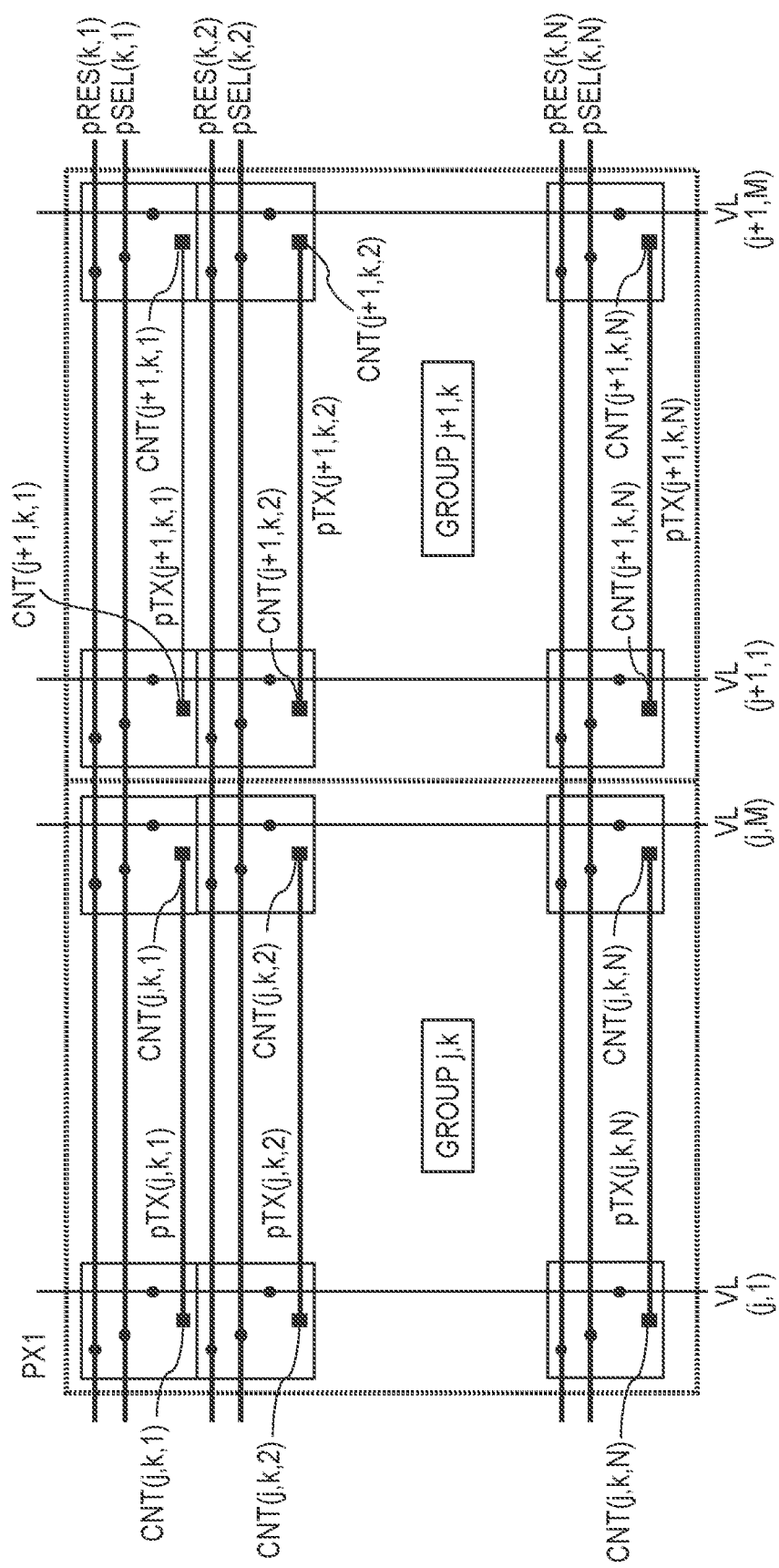

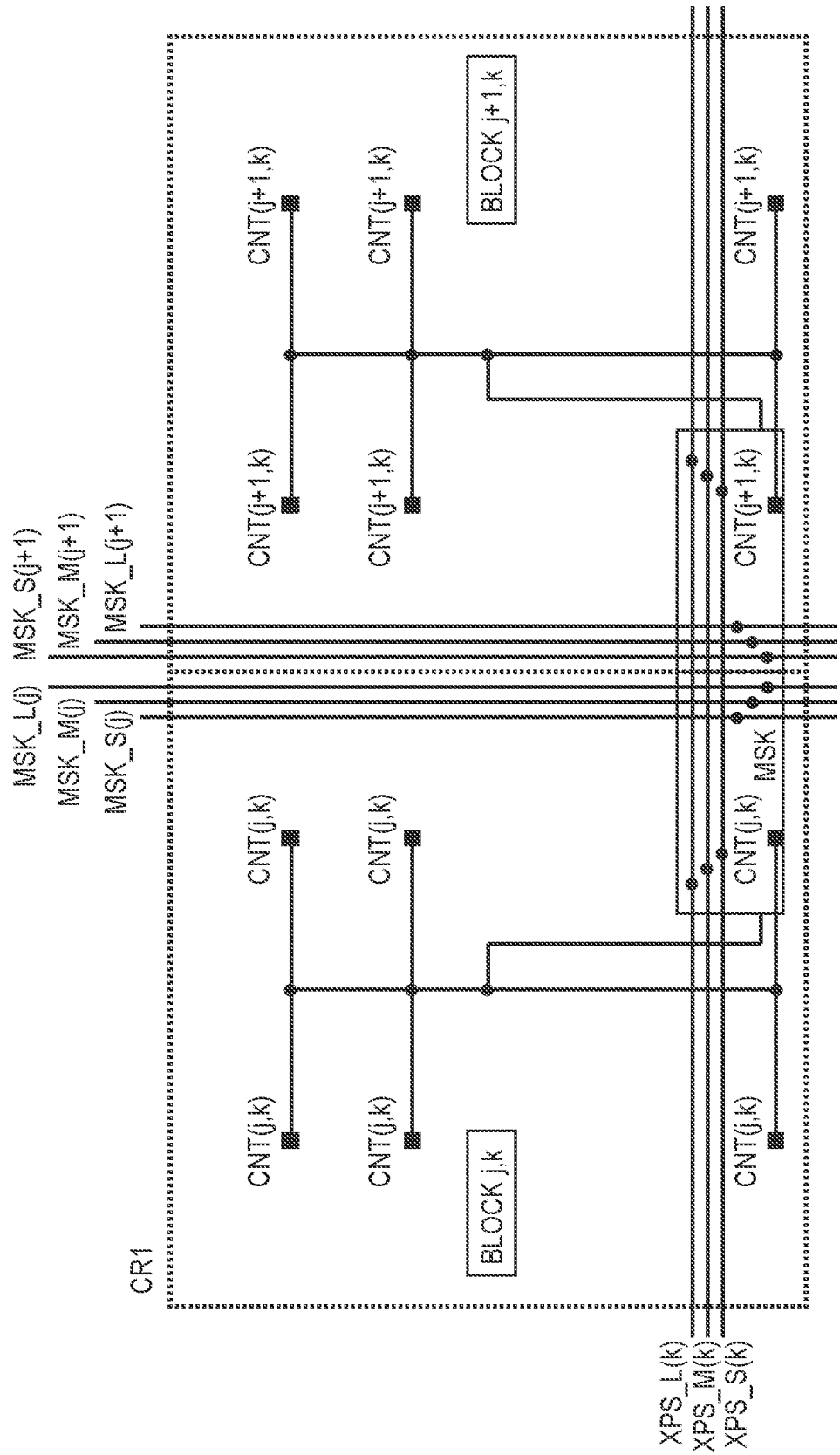

PHOTOELECTRIC CONVERSION DEVICE WITH MASK CIRCUITS

This is a continuation of U.S. patent application Ser. No. 16/568,423, filed Sep. 12, 2019.

BACKGROUND OF THE INVENTION

Field of the Invention

The present invention relates to a photoelectric conversion device and an image sensing system.

Description of the Related Art

Japanese Patent Laid-Open No. 2012-151847 discloses an image sensor formed by stacking a first substrate and a second substrate. The first substrate includes a plurality of pixels, and the second substrate includes a component to make a pixel or pixel group match their respective integration times. A plurality of elements that form rows and columns for generating operation signals for the first substrate are arranged in the second substrate, and each element includes a memory which stores an integration time parameter and a circuit which generates the operation signal based on a reference integration time base and the integration time parameter. The reference integration time base is supplied to the elements of each row via a bus.

An integration time can be set for each pixel or for each group of pixels in the image sensor disclosed in Japanese Patent Laid-Open No. 2012-151847. However, the arrangement of the image sensor becomes complex because a memory for storing an integration time parameter and a circuit for generating an operation signal based on the reference integration time base and the integration time parameter need to be included in each element arranged on the second substrate.

SUMMARY OF THE INVENTION

The present invention provides a technique advantageous in implementing a function for individually controlling each block formed by a plurality of unit circuits in a simpler arrangement.

One of aspects of the present invention provides a photoelectric conversion device comprising: a first substrate in which a plurality of blocks each including a plurality of photoelectric converters are arranged so as to form a plurality of columns and a plurality of rows; and a second substrate in which at least a part of a processing circuit for reading out signals from the plurality of photoelectric converters of each of the plurality of blocks is arranged, wherein the processing circuit is configured to drive a plurality of driving signal lines for driving the plurality of photoelectric converters of each of the plurality of blocks, the plurality of driving signal lines include a plurality of first signal lines each arranged in the first substrate and commonly assigned to at least two blocks arranged in a row direction of the plurality of blocks and a plurality of second signal lines each individually assigned to one block of the plurality of blocks, the processing circuit includes a plurality of transmission lines and a plurality of selection circuits each corresponding to one second signal line of the plurality of second signal lines, and each of the plurality of selection circuits selects one driving signal from a plurality of driving signals supplied to the plurality of transmission lines, and supplies the selected driving signal to a corresponding second signal line of the plurality of second signal lines.

Further features of the present invention will become apparent from the following description of exemplary embodiments with reference to the attached drawings.

BRIEF DESCRIPTION OF THE DRAWINGS

FIG. 1A is a plan view of a first substrate that forms a part of a photoelectric conversion device according to the first embodiment of the present invention;

FIG. 6 is a view showing an example of the arrangement of a mask circuit;

FIGS. 7A and 7B are plan views showing parts of the arrangement of a photoelectric conversion device according to the second embodiment of the present invention;

FIGS. 15A and 15B are views showing another example of the arrangement of the mask circuit;

DESCRIPTION OF THE EMBODIMENTS

Exemplary embodiments of the present invention will be described hereinafter with reference to the accompanying drawings. Although a photoelectric conversion device 1 according to the present invention can be implemented as, for example, a solid-state image sensor such as a MOS image sensor or as a distance measurement device that measures a range image (distance image), range information (distance information), or the like, the present invention is not limited to these devices.

Figure 1B:
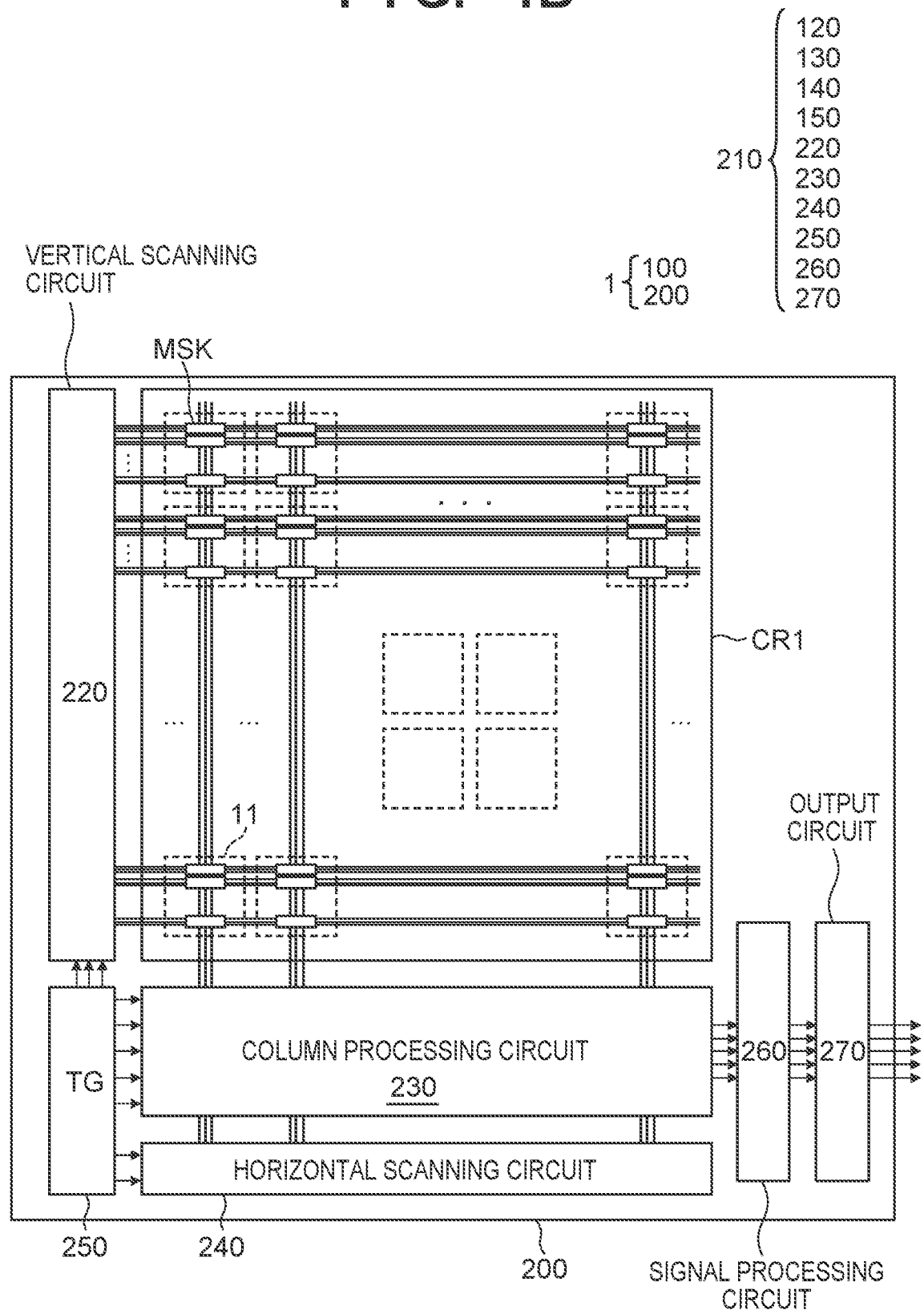
FIG. 1B is a plan view of a second substrate that forms another part of the photoelectric conversion device according to the first embodiment of the present invention.

FIG. 1A is a plan view of a first substrate 100 which forms a part of the photoelectric conversion device 1 according to the first embodiment of the present invention, and FIG. 1B is a plan view of a second substrate 200 which forms another part of the photoelectric conversion device 1 according to the first embodiment of the present invention. The photoelectric conversion device 1 according to the first embodiment of the present invention is formed by stacking the first substrate 100 and the second substrate 200. The circuit elements of the first substrate 100 and the circuit elements of the second substrate 200 can be electrically connected to each other via connecting portions CNT (to be described later). Although an example in which the photoelectric conversion device 1 is formed by the first substrate 100 and the second substrate 200 will be described here, the photoelectric conversion device 1 may be formed by a stack of three or more substrates. In addition, FIGS. 1A and 1B show merely an example of a state in which the circuit elements forming the photoelectric conversion device 1 are distributed among the first substrate 100 and the second substrate 200, and the method of distributing the circuit elements among a plurality of substrates is not limited to this example. For example, an output circuit 270 arranged in the second substrate 200 shown in FIG. 1B may be arranged in the first substrate 100 shown in FIG. 1A.

A plurality of first blocks 10 (circuits indicated by rectangles formed by dotted lines in FIG. 1A) which are arranged in a matrix so as to form a plurality of columns (block columns) and a plurality of rows (block rows) can be arranged in the first substrate 100. In other words, each row (block row) can be formed by two or more first blocks 10, and each column (block column) can be formed by two or more first blocks 10. Each first block 10 can include a plurality of unit circuits PIX. The plurality of unit circuits PIX of each first block 10 can be arranged so as to form a plurality of columns (unit circuit columns) and a plurality of rows (unit circuit rows). Each unit circuit PIX includes one photoelectric converter. Hence, a unit circuit array PIX1 can be understood as an array in which a plurality of photoelectric converters are arranged so as to form a plurality of rows and a plurality of columns. Note that each block column and each unit circuit column extend in the same direction as each other, and each block row and each unit circuit row extend in the same direction as each other. A row is a direction in which signal lines which are driven by first vertical scanning circuits 120 and 220 (to be described later) extend, and a column is a direction in which vertical signal lines VL (to be described later) extend. The first vertical scanning circuit 120 and the second vertical scanning circuit 220 are circuits for sequentially scanning or selecting a plurality of rows.

At least some of processing circuits 210 for reading out signals from each of the plurality of unit circuits (pixels) PIX (photoelectric converter) of the plurality of first blocks 10 can be arranged in the second substrate 200. A plurality of second blocks 11 (circuits indicated by rectangles formed by dotted lines in FIG. 1B) which are arranged in a matrix so as to form a plurality of columns (block columns) and a plurality of rows (block rows) can be arranged in the second substrate 200. In other words, each row (block row) can be formed by two or more second blocks 11, and each column (block column) can be formed by two or more second blocks 11. In this case, the plurality of second blocks 11 are arranged so that one second block 11 will correspond to one first block 10. Each second block 11 includes a circuit (a readout control circuit) for reading out signals from the plurality of unit circuits PIX (photoelectric converters) of the corresponding first block 10. The plurality of second blocks 11 arranged in a matrix so as to form a plurality of columns (block columns) and a plurality of rows (block rows) form an auxiliary circuit array CR1. Each second block 11 can include, for example, a mask circuit MSK. The boundary between adjacent first blocks 10 in FIG. 1A may be identical to or different from the boundary between adjacent second blocks 11 in FIG. 1B.

The processing circuits 210 for reading out signals from the plurality of photoelectric converters of the plurality of first blocks 10 can include, for example, the first vertical scanning circuit 120, the second vertical scanning circuit 220, a first timing generation circuit 150, a second timing generation circuit 250, a first column processing circuit 130, and a second column processing circuit 230. The processing circuits for reading out signals from a plurality of photoelectric converters of the plurality of first blocks 10 can further include a first horizontal scanning circuit 140, a second horizontal scanning circuit 240, a signal processing circuit 260, and the output circuit 270.

Each of the first vertical scanning circuit 120 and the second vertical scanning circuit 220 selects and drives, in a predetermined order, the plurality of rows (rows of the array formed by the plurality of unit circuits PIX) arranged unit circuit array PX1. In this example, the first vertical scanning circuit 120 and the second vertical scanning circuit 220 are arranged in the first substrate 100 and the second substrate 200, respectively. The first timing generation circuit 150 and the second timing generation circuit 250 supply timing signals to the first vertical scanning circuit 120 and the second vertical scanning circuit 220, respectively, the first column processing circuit 130 and the second column processing circuit 230, respectively, and the first horizontal scanning circuit 140 and the second horizontal scanning circuit 240, respectively.

Each of the first column processing circuit 130 and the second column processing circuit 230 reads out and processes signals from a row of unit circuits PIX, which have been selected by the corresponding one of the first vertical scanning circuit 120 and the second vertical scanning circuit 220, of the plurality of rows formed by the unit circuits PIX arranged in the unit circuit array PX1. Each of the first column processing circuit 130 and the second column processing circuit 230 can include, for example, an amplifier circuit, a correlated double sampling circuit, an AD conversion circuit, and the like. In this example, the first column processing circuit 130 and the second column processing circuit 230 are arranged in the first substrate 100 and the second substrate 200, respectively.

Each of the first horizontal scanning circuit 140 and the second horizontal scanning circuit 240 selects, in a predetermined order, signals of a row of the unit circuit array PX1 processed by the corresponding one of the first column processing circuit 130 and the second column processing circuit 230, and provides the selected signals to the signal processing circuit 260. In this example, the first horizontal scanning circuit 140 and the second horizontal scanning circuit 240 are arranged in the first substrate 100 and the second substrate 200, respectively. The signal processing circuit 260 processes the signals selected by the first horizontal scanning circuit 140 and the second horizontal scanning circuit 240 and supplies the processed signals to the output circuit 270. The output circuit 270 outputs, in a predetermined order, the signals supplied from the signal processing circuit 260. In this example, the signal processing circuit 260 and the output circuit 270 are arranged in the second substrate 200.

Figure 2:
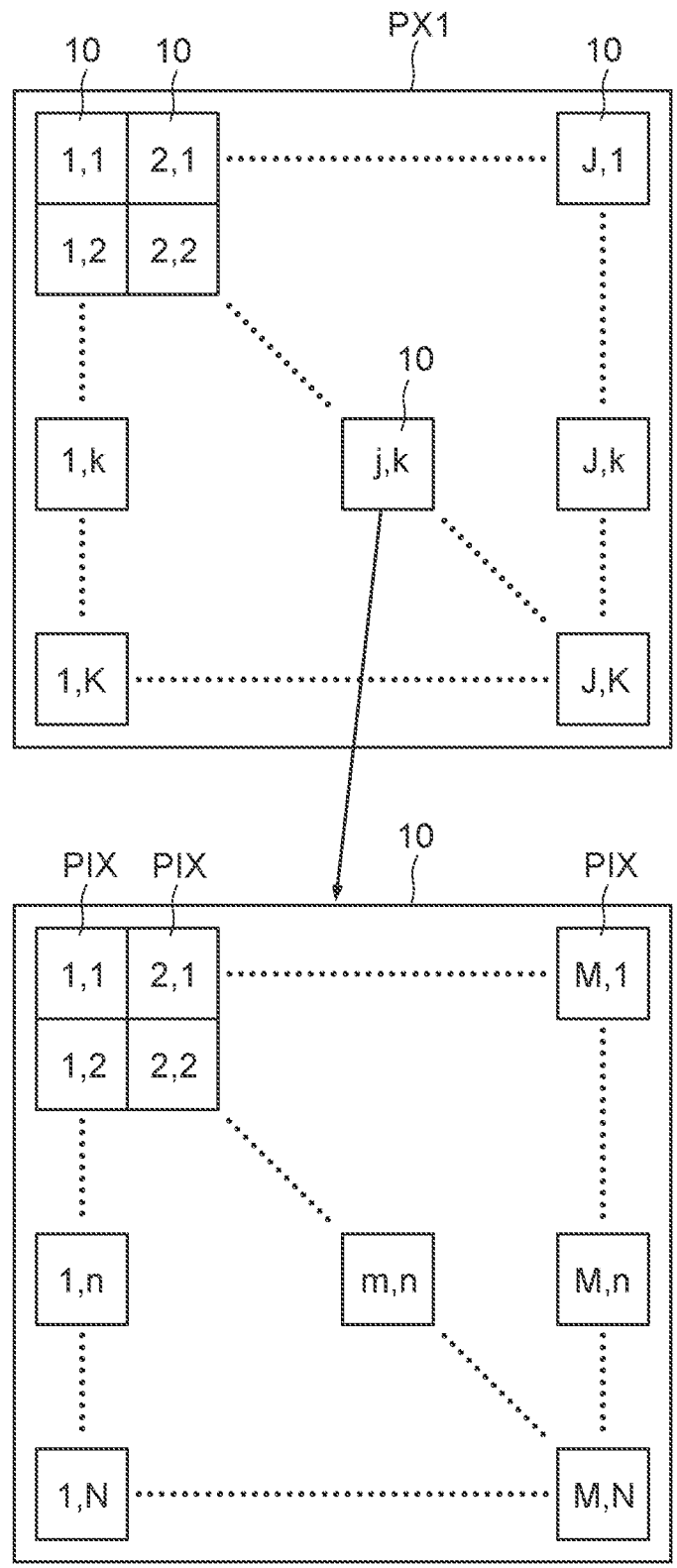
FIG. 2 is a view showing an example of the arrangement of a unit circuit array (pixel array)

FIG. 2 shows an example of the arrangement of the unit circuit array (pixel array) PX1. The plurality of first blocks 10 which are arranged in a matrix so as to form J columns (block columns) and K rows (block rows) can be arranged in the first substrate 100. In other words, each row (block row) can be formed by J first blocks 10, and each column (block column) can be formed by K first blocks 10. Each first block 10 can include a plurality of unit circuits PIX. The plurality of unit circuits PIX of each first block 10 can be arranged so as to form M columns and N rows. The unit circuit array PX1 is formed by J×m×K×N unit circuits PIX arranged so as to form J×M columns and K×N rows. Each unit circuit PIX includes one photoelectric converter. Hence, the unit circuit array PX1 can be understood as a photoelectric conversion array in which J×M×K×N photoelectric converters have been arranged so as to form J×M columns and K×N rows.

Figure 3:
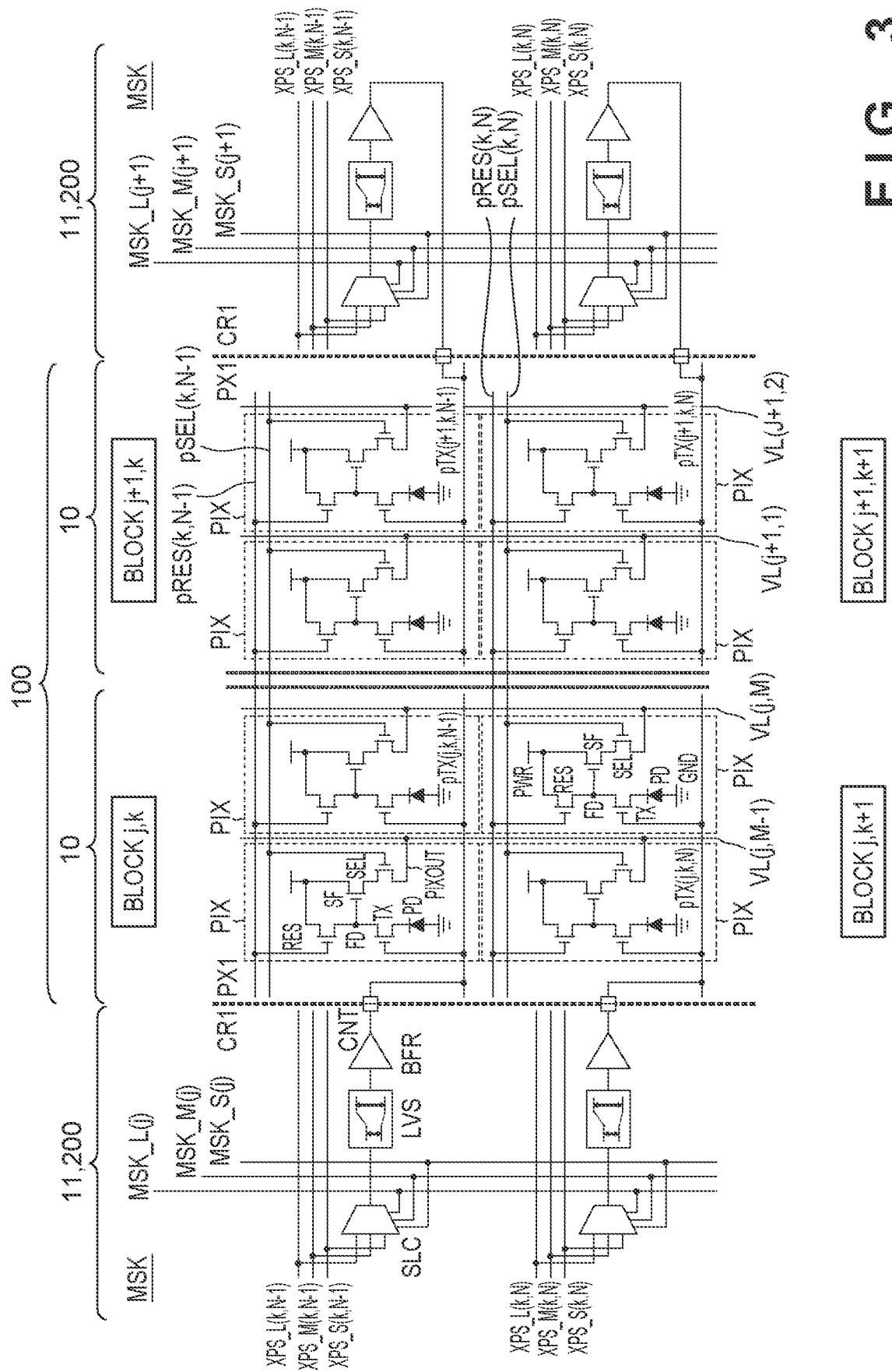
FIG. 3 is a diagram showing an example of the arrangement of a first block arranged in the first substrate and a second block arranged in the second substrate and an example of the connection between the first block and the second block.

FIG. 3 shows an example of the arrangement of the first blocks 10 arranged in the first substrate 100 and the second blocks 11 arranged in the second substrate 200, and the connection example between the first blocks 10 and the second blocks 11. The first blocks 10 arranged in a matrix of 2 columns×2 rows are shown here for the sake of descriptive convenience. In FIG. 3, each second block 11 includes the mask circuit MSK. The input terminal of each first block 10 and the output terminal of each second block 11 are electrically connected to each other via the connecting portion CNT.

Each unit circuit (pixel) PIX can include a photoelectric converter PD, a charge-voltage converter FD, and a transfer unit TX for transferring charges from the photoelectric converter PD to the charge-voltage converter FD. Also, each unit circuit PIX can include an amplifier SF that outputs a signal corresponding to the potential of the charge-voltage converter FD to (the corresponding one of the first column processing circuit 130 and the second column processing circuit 230 via) a corresponding vertical signal line VL. Each unit circuit PIX can also include a reset unit RES for resetting the potential of the charge-voltage converter FD. Each unit circuit PIX can also include a selection unit SEL for setting the unit circuit PIX in a selected state. The transfer unit TX, the amplifier SF, the reset unit RES, and the selection unit SEL can be formed by transistors.

The transfer unit TX becomes conductive (set to ON) when an active-level signal is supplied to the gate (control terminal) via a corresponding transfer signal line pTX, and transfers the charges of the photoelectric converter PD to the charge-voltage converter FD. In order to indicate the row in the unit circuit array PX1, each transfer signal line pTX will also be denoted as pTX(x, y, z). The reset unit RES becomes conductive when an active-level signal is supplied to the gate (control terminal) via a corresponding reset signal line pRES, and resets the potential of the charge-voltage converter FD to the reset potential. In order to indicate the row in the unit circuit array PX1, each reset signal line pRES will also be denoted as pRES(x, y, z). The selection unit SEL becomes conductive when an active-level signal is supplied to the gate (control terminal) via a corresponding selection signal line pSEL, and sets the unit circuit PIX in the selected state. In order to indicate the row in the unit circuit array PX1, each selection signal line pSEL will also be denoted as pSEL(x, y, z).

Each of the transfer signal line pTX, the reset signal line pRES, and the selection signal line pSEL is one of a plurality of driving signal lines for driving the unit circuit PIX (the photoelectric converter PD). The plurality of driving signal lines can include a plurality of first signal lines and a plurality of second signal lines. The plurality of first signal lines can include, for example, the plurality of reset signal lines pRES, each of which is arranged in a corresponding one of the plurality of rows, and the plurality of the selection signal lines pSEL, each of which is arranged in a corresponding one of the plurality of rows. The plurality of second signal lines can include the plurality of the transfer signal lines pTX, each of which is arranged in a corresponding one of the plurality of blocks 10. Each of the plurality of first signal lines is a signal line which is commonly assigned to at least two blocks 10 (one row of blocks 10) arranged side by side in the row direction among the plurality of the blocks 10. Each of the plurality of second signal lines is a signal line assigned individually to one block 10 among the plurality of blocks 10.

The arrangement of each unit circuit PIX is not limited to the arrangement shown in FIG. 3. For example, the charge-voltage converter FD may be shared among the plurality of photoelectric converters PD. Alternatively, the selection/non-selection of each unit circuit PIX may be implemented by controlling the reset voltage of the charge-voltage converter FD instead of arranging the selection unit SEL. Also, some of the circuit elements forming each unit circuit PIX may be arranged in the second substrate 200. Furthermore, the vertical signal lines VL may be arranged in the second substrate 200.

The transfer signal line pTX which controls the exposure time (charge accumulation time) of each photoelectric converter PD of each row (unit circuit row) for each block 10 is arranged in the photoelectric conversion device 1 according to the first embodiment. Such an arrangement allows the exposure time to be set appropriately for each block. For example, for the block 10 that receives a light beam from a bright portion of an object, a short exposure time can be set to avoid rapid saturation of the photoelectric converter PD. On the other hand, for the block 10 that receives a light beam from a dark portion of the object, a long exposure time can be set to increase the number of accumulated charges.

In this example, J transfer signal lines pTX will be arranged for each row if there are J blocks 10 for each row. From another view point, if there are J×K blocks 10 in the unit circuit array PX1 and there are N rows in each block 10, J×K×N transfer signal lines pTX can be arranged. In this case, the arrangement of the photoelectric conversion device 1 can be simplified by reducing the number of transfer signal lines pTX by forming one block 10 by two or more photoelectric converters PD (or unit circuits PIX).

The determination of the exposure time of each block 10 can be performed by, for example, the signal processing circuit 260 of the photoelectric conversion device 1 based on the luminance of the region corresponding to each block 10 of the preceding frame (image). Alternatively, the determination of the exposure time of each block 10 can be performed by a device outside the photoelectric conversion device 1, and information based on this determination may be provided to the photoelectric conversion device 1. Also, whether the object is a moving object or a still object may be considered in addition to the luminance of a region corresponding to each block 10 in the preceding frame (image). The luminance to be considered may be the average value, the mode, or the peak value of each block.

For the sake of descriptive convenience, in order to indicate each individual block 10 among the plurality of blocks 10, a block arranged in the j-th column and the k-th row will be represented as a block 10(j, k) by using coordinates. For each driving signal line, each of the selection signal line pSEL and the reset signal line pRES arranged in the n-th row unit circuits PIX of the k-th row block 10(*, k) will be represented as the selection signal line pSEL(k,n) and the reset signal line pRES(k, n), respectively. In a similar manner, the n-th row transfer signal line pTX of the block 10(j, k) will be represented as pTX(j, k, n). In relation to the vertical signal line VL, the m-th column vertical signal line VL of pixels belonging to a j-th column block 10(j, *) will be represented as a vertical signal line VL(j, m). In addition, the connecting portion CNT arranged in the block 10(j, k) will be represented as a connecting portion CNT(j, k).

Figure 4A:
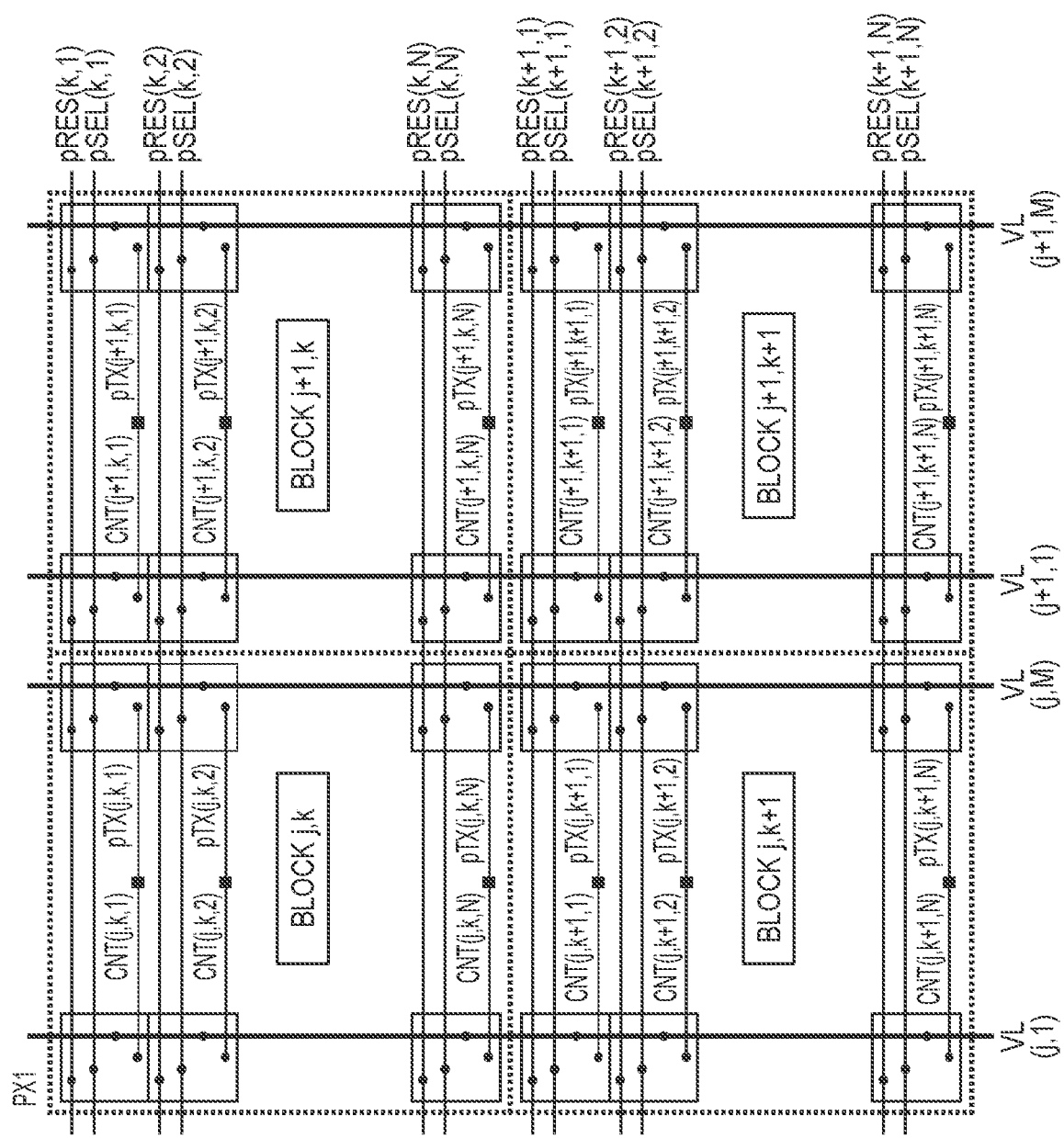
FIG. 4A is a plan view showing a driving signal lines pTX arranged in the first block formed as a 2 (column)×2 (row) matrix in a unit circuit array of the first substrate.
Figure 4B:
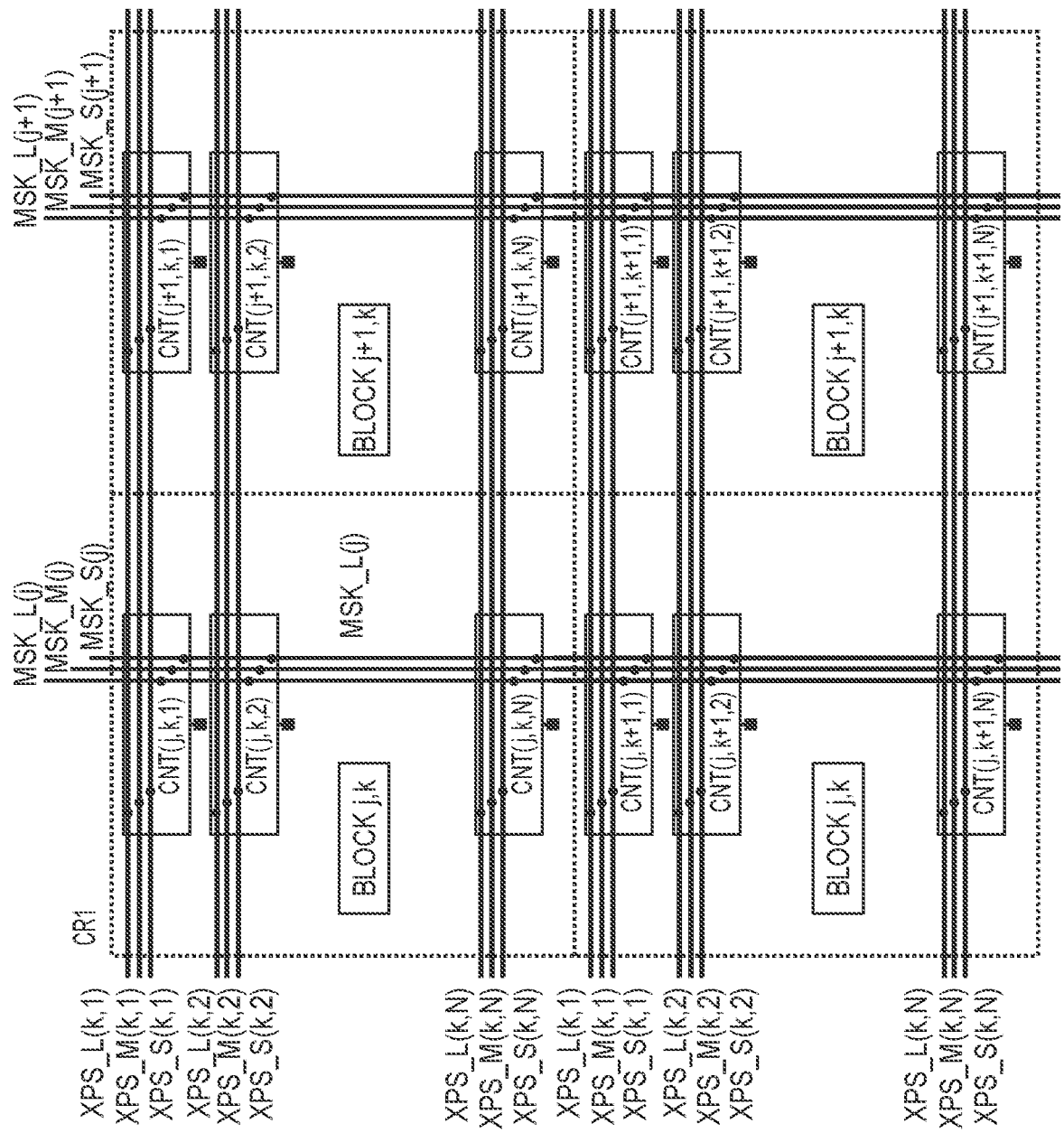
FIG. 4B is a plan view showing exposure time signal lines XPS_* and exposure time selection lines MSK_* arranged in the second block formed as a 2 (column)×2 (row) matrix in an auxiliary circuit array of the second substrate.

FIG. 4A is a view showing the transfer signal lines pTX arranged in the block 10 of a 2×2 matrix in the unit circuit array PX1 of the first substrate 100. FIG. 4B is a view showing exposure time signal lines XPS_* and exposure time selection lines MSK_* arranged in the second block 11 of a 2×2 matrix in the auxiliary circuit array CR1 of the second substrate 200.

In the unit circuit array PX1, each selection signal line pSEL which is a driving signal line for driving the selection units SEL and each reset signal line pRES which is a driving signal line for driving the reset units RES extend across a plurality of blocks 10 arranged in the row direction. Also, in the unit circuit array PX1, each vertical signal line VL extends across a plurality of blocks 10 arranged in the column direction. On the other hand, in the auxiliary circuit array CR1, a group formed by a plurality of exposure time signal lines XPS_L, XPS_M, and XPS_S as a plurality of transmission lines is arranged so as to extend in the row direction for each row formed in the unit circuit PIX. The exposure time signal line XPS_L is a signal line for long exposure time, the exposure time signal line XPS_M is a signal line for medium exposure time, and the exposure time signal line XPS_S is a signal line for short exposure time. Also, a group formed by a plurality of exposure time selection lines MSK_L, MSK_M, and MSK_S for selecting the exposure time for each block 10 is arranged so as to extend in the column direction for each column (block column) formed in the second block 11. The exposure time selection line MSK_L is a selection line for the long exposure time, the exposure time selection line MSK_M is a selection line for the medium exposure time, and the exposure time selection line MSK_S is a selection line for short exposure time. A driving signal (transfer signal) selected (generated) in the mask circuit MSK is supplied to the transfer signal line pTX via the connecting portion CNT by using the exposure time signal line XPS_* and the exposure time selection line MSK_*. That is, as electrical nodes in this example, the output terminal of the mask circuit MSK and the input terminal of the transfer unit TX of the unit circuit PIX corresponding to the mask circuit MSK are electrically connected each other by the transfer signal line pTX.

The exposure time can be controlled by the transfer signal line pTX that controls the transfer timing of charges from the photoelectric converter PD to the charge-voltage converter FD. Hence, to control the exposure times of the unit circuits PIX (the photoelectric converters PD) of each row for each block 10 of each row (unit circuit row), the transfer signal line pTX for controlling the transfer unit TX is arranged for each block 10 of each row (unit circuit row). The selection signal line pSEL and the reset signal line pRES are commonly assigned for the unit circuits PIX (photoelectric converters PD) of each row.

In addition, to increase the signal to noise ratio of the input/output signals of each unit circuit PIX, for example, a power supply voltage used in the circuits arranged in the second substrate 200, a power supply voltage with a high voltage amplitude, and a voltage amplitude are employed in the unit circuit PIX. More specifically, in the arrangements shown in FIGS. 4A and 4B, the driving signal lines pSEL, pRES, and pTX for driving the unit circuit PIX and the vertical signal line VL for outputting signals form the unit circuit PIX can be driven by a high voltage amplitude. On the other hand, the exposure time signal line XPS_* and the exposure time selection line MSK_* that do not directly drive the unit circuit PIX need not be driven by a high voltage amplitude. Hence, a transfer signal in accordance with the driving timing that has been determined in the mask circuit MSK is converted into a high voltage amplitude, and the transfer signal line pTX can be driven at the high voltage amplitude.

In addition, if the potential of the transfer signal line pTX changes due to capacitive coupling with another signal line, it may cause charges to leak from the photoelectric converter PD or cause noise such as a dark current to mix into the photoelectric converter PD, and the image quality may degrade. It is preferable, also from this viewpoint, to arrange each transfer signal line pTX for driving the transfer unit corresponding TX so it will not extend across the plurality of blocks 10. In addition, it is preferable to suppress the generation of voltage variation due to capacitive coupling by causing the exposure time signal line XPS_* and the exposure time selection line MSK_* for determining the driving timing of the transfer signal line pTX to operate at a low voltage amplitude. From these viewpoints described above, the mask circuit MSK increases the output amplitude of a selection circuit SLC for selecting the exposure time signal line XPS_* in accordance with the exposure time selection line MSK_* by using a voltage amplitude converter circuit LVS, and drives the transfer signal line pTX after further buffering the output amplitude in the buffer circuit BFR.

In addition, by distributing and arranging the driving lines of each unit circuit PIX in the wiring line portions of the plurality of substrates as shown in FIGS. 3, 4A, and 4B, it is possible to select a suitable manufacturing method in accordance with the voltage amplitude of each substrate. Furthermore, it can reduce the risk of a short circuit or a defect occurring due to the generation of a particle during the manufacturing process by reducing the number of driving signal lines for each unit circuit PIX and widening the interval between the wiring lines.

Figure 5:
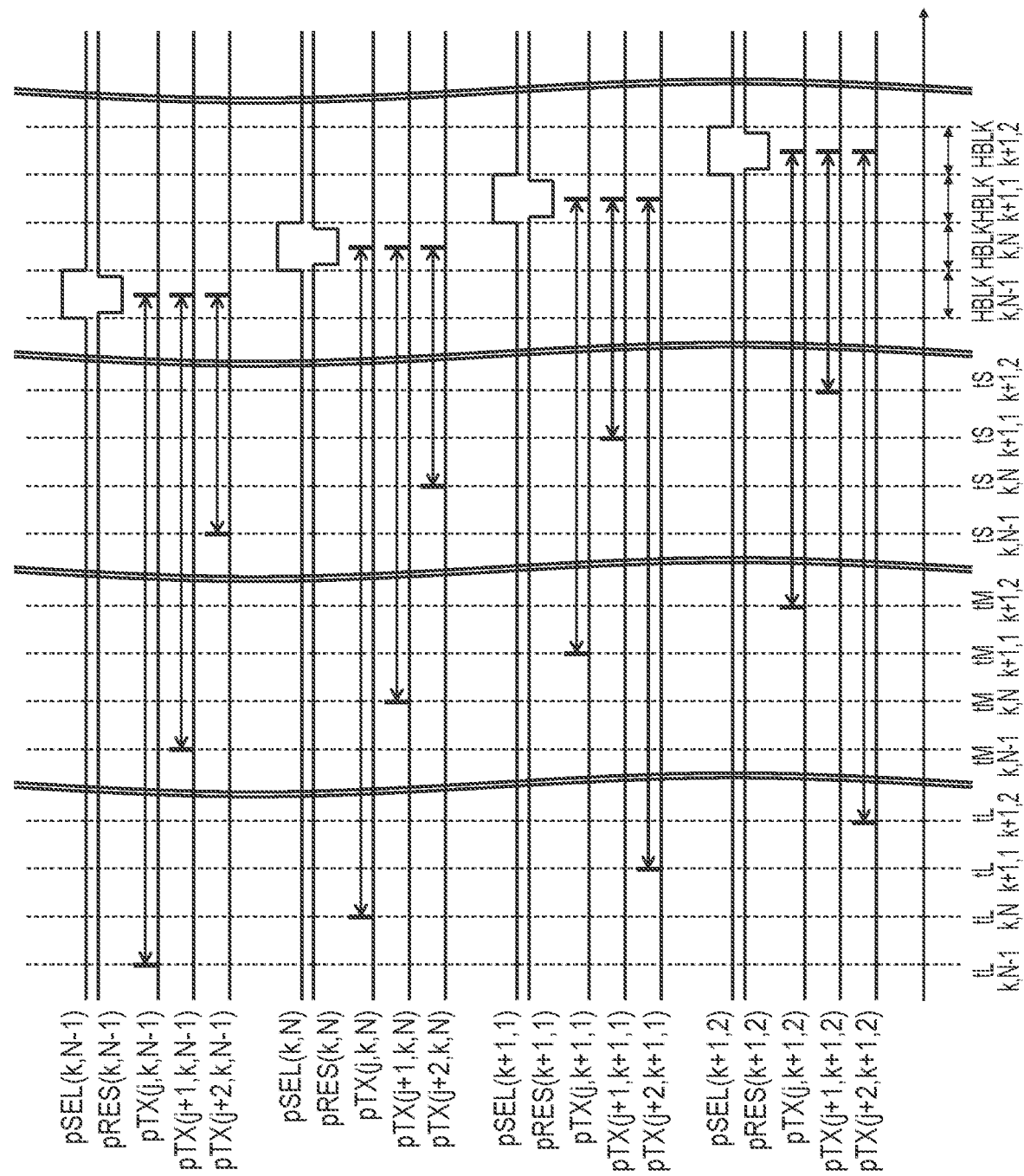
FIG. 5 is a timing chart showing an example of driving timings of the photoelectric conversion device.

FIG. 5 shows an example of the driving timings of the photoelectric conversion device 1. The photoelectric converter PD of each unit circuit PIX of each row is reset by the reset unit RES via the transfer unit TX before a readout timing HBLK. The time from the reset operation until charges are transferred from the photoelectric converter PD to the charge-voltage converter FD by the transfer unit TX at the readout timing HBLK is the exposure time (charge accumulation time) of each photoelectric converter PD. In this embodiment, the exposure time can be set for each block 10 for each row.

Assume here that XPS(j, k, n) and HBLK(j, k, n) denote the exposure time XPS and the readout timing HBLK, respectively, of the unit circuit PIX belonging to the block 10(j, k) of the nth row. Since HBLK(j, k, n) and HBLK(j+1, k, n) denote the same time, j and j+1 are omitted and indicated as HBLK(k, n) in FIG. 5.

Assume that the block 10(j, k), a block 10(j+1, k), and a block 10(j+2, k) have been determined to have low luminance, medium luminance, and high luminance, respectively. At this time, as the exposure times, XPS(j, k, n) is the longest (tL), XPS(j+1, k, n) is about medium (tM), and XPS(j+2, k, n) is the shortest (tS). For example, tL is about 16.6 msec (about $\frac{1}{60}$ sec), tM is about 1 msec (about $\frac{1}{1000}$ sec), and tS is about 62.5 μsec (about $\frac{1}{16000}$ sec). Transfer signal lines pTX(j, k, N−1), pTX(j+1, k, N−1), and pTX(j+2, k, N−1) of the N-th row of the block 10(*, k) belonging to the k-th row first change to the conductive state at tL(k, N−1), tM(k, N−1), and tS(k, N−1), respectively. At this time, the photoelectric converters PD of the blocks are reset. Subsequently, signal readout from each photoelectric converter PD is performed at HBLK(k, N−1). Transfer signal lines pTX(j, k, N), pTX(j+1, k, N), and pTX(j+2, k, N) of the N-th row change to the conductive state at tL(k, N), tM(k, N), and tS(k, N), respectively. Next, assume that blocks 10(j, k+1), 10(j+1, k+1), and 10(j+2, k+1) have been determined to have medium luminance, low luminance, and high luminance, respectively. At this time transfer signal lines pTX(j, k+1, 1), pTX(j+1, k+1, 1), and pTX(j+2, k+1, 1) change to the conductive state at tM(k+1, 1), tS(k+1, 1), and tL(k+1, 1), respectively. Next, transfer signal lines pTX(j, k+1, 2), pTX(j+1, k+1, 2), and pTX(j+2, k+1, 2) change to the ON state at tM(k+1, 2), tS(k+1, 2), and tL(k+1, 2), respectively. The exposure operation (accumulation operation) and the readout operation are performed sequentially in this manner. The exposure times (charge accumulation times) are not limited to these, and may be changed appropriately. Although three kinds of exposure times are set in the above-described example, four or more kinds of exposure times may be set. Times tL, tM, and tS may be set to be shorter or longer than those set in the example described above.

Although the driving pulses of the driving signal lines pSEL and pRES are shown to have a rectangular waveform in FIG. 5, the waveform of each driving pulse will be rounded in reality due to the wiring resistance, the capacitance of the driving element, coupling capacitance, or the like. The rounding of the waveform can influence the shift in the linearity of the exposure time or the charge transfer speed during the readout operation of signals from each photoelectric converter PD. The image sensor cannot be operated at a short shutter speed in a case in which the shift in the linearity of the exposure time is large, and the frame rate of the photoelectric conversion device 1 cannot be increased in a case in which the charge transfer speed is low. That is, it will be difficult to improve the performance of the photoelectric conversion device 1. Hence, as shown in the example of FIG. 3, in order to suitably drive the plurality of transfer units TX which are driven by the corresponding transfer signal lines pTX, it is preferable install each buffer circuit BFR near the corresponding transfer signal line pTX.

FIG. 6 is a view showing an example of the arrangement of each mask circuit MSK. Each mask circuit MSK can include the selection circuit SLC, the voltage amplitude converter circuit LVS, and the buffer circuit BFR. The selection circuit SLC outputs the waveform of an exposure time signal selected, among the plurality of exposure time signals supplied to the plurality of exposure time signal lines XPS_*, by the selection signal supplied to the exposure time selection line MSK_*. The voltage amplitude converter circuit LVS outputs a signal obtained by increasing the voltage amplitude of the exposure time signal output from the selection circuit SLC. The buffer circuit BFR outputs an exposure time signal that has the same voltage amplitude as the voltage amplitude of the signal output from the voltage amplitude converter circuit LVS. The buffer circuit BFR has a driving capability corresponding to the number of the transfer units TX which are to be driven by the exposure time signal.

The mask circuit MSK shown in FIG. 6 has a function for selecting one transmission line from the plurality of transmission lines (exposure time signal lines), a function for voltage amplitude conversion, and a function for buffering. Another arrangement may be employed as long as these functions can be obtained. For example, in relation to the voltage amplitude converter circuit, a common GND level can be used as the high voltage amplitude GND level and the low voltage amplitude GND level or a circuit to apply a negative voltage on the GND level may be added. In addition, the magnification can be changed in relation to the buffer circuit.

According to the first embodiment, the photoelectric conversion device 1 that can set the exposure time (charge accumulation time) of each photoelectric converter PD of each block 10 can be implemented by a simple arrangement. That is, according to the first embodiment, it is possible to use a simpler arrangement to implement a function for individually controlling each block formed by a plurality of unit circuits. For example, the exposure time can be controlled for each block 10 by a driving signal line selected by the selection circuit SLC from a plurality of driving signals supplied to the plurality of exposure time signal lines (transmission lines). Such an arrangement does not require a memory for storing information which indicates the exposure time for each block 10. Also, according to the first embodiment, the number of signal lines can be decreased compared to that of an arrangement in which the exposure time signal lines are provided individually for each block 10. This is advantageous in, for example, reducing the coupling capacitance between the signal lines, improving the degree of freedom in the design, and improving the arrangement density of the photoelectric converter.

Figure 7B:
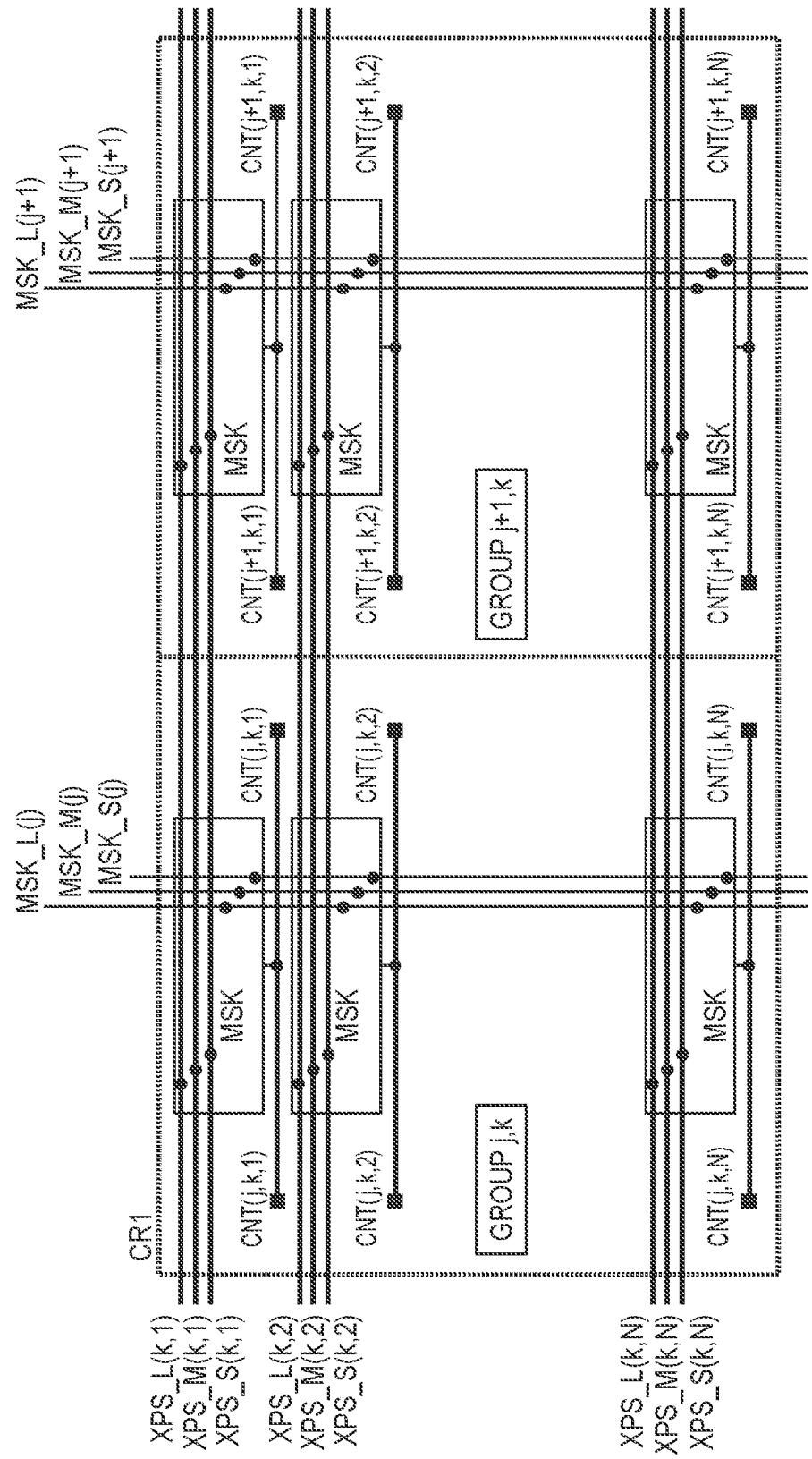

FIGS. 7A and 7B are views showing parts of the arrangement of a photoelectric conversion device 1 according to the second embodiment of the present invention. The second embodiment provides a modification of the first embodiment. Matters not mentioned here as the second embodiment follow those described in the first embodiment. In the example shown in FIGS. 4A and 4B, a transfer signal buffered by a buffer circuit BFR and supplied to a transfer signal line pTX(j, k, n) is supplied to a block 10(j, k) via a connecting portion CNT at almost the center of the block 10(j, k) in the column direction. In the block 10(j, k), the rounding of the transfer signal to be received changes for each unit circuit PIX close to the connecting portion CNT and for each unit circuit PIX (each unit circuit PIX positioned at the edge of the block 10 (j, k) away from the connecting portion CNT. This is generated by the load (parasitic capacitance) difference which depends on the length of the path through which the transfer signal is transmitted.

Figure 8A:
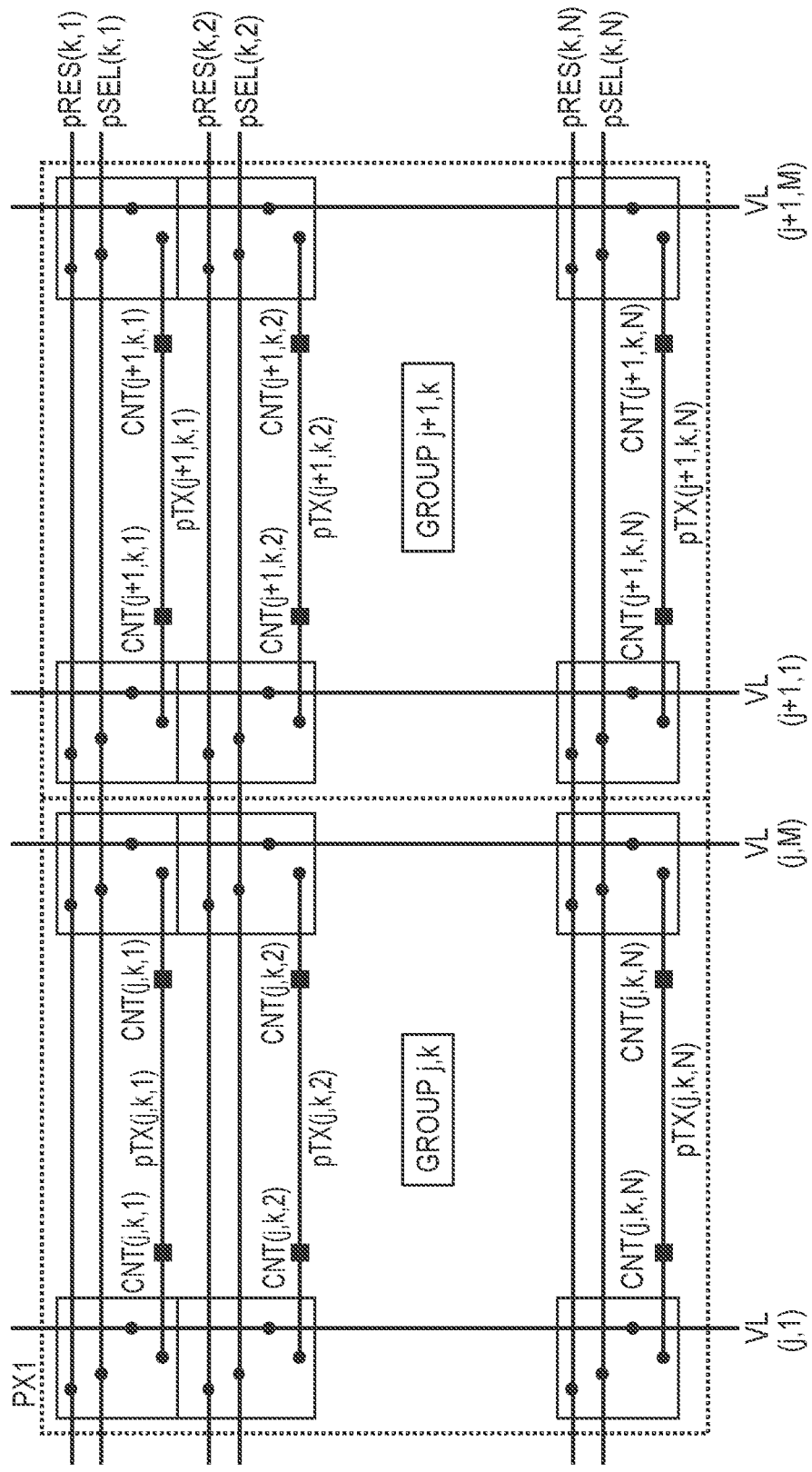
FIGS. 8A and 8B are plan views showing parts of the arrangement of a modification of the photoelectric conversion device according to the second embodiment of the present invention.
Figure 8B:
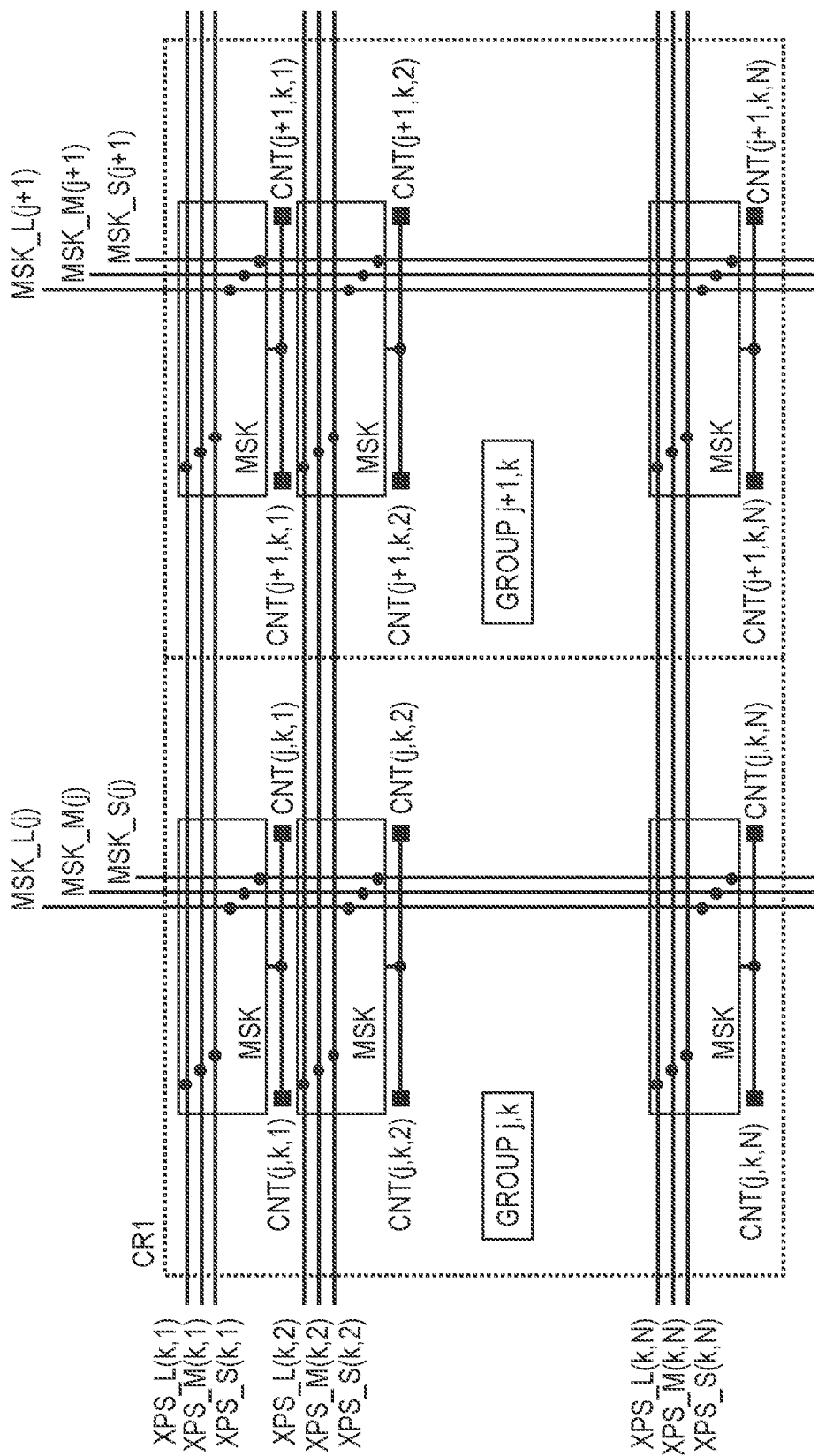

The arrangement and the number of the connecting portions CNT in the block 10 of the second embodiment shown in FIGS. 7A and 7B differ from those of the first embodiment shown in FIGS. 4A and 4B. In the second embodiment, in an auxiliary circuit array CR1, a transfer signal line output from the buffer circuit BFR is branched and connected to a unit circuit array PX1 via the connecting portions CNT which correspond to the branched transfer signal line and arranged at the edge of the block 10 (*j, k*). This arrangement can reduce rounding of the transfer signal due to parasitic resistance. In the arrangement shown in FIGS. 7A and 7B, the rounding of the transfer signal may occur the most at the center of the block 10 (*j, k*). FIGS. 8A and 8B show the modification of the arrangement shown in FIGS. 7A and 7B. In the example of the arrangement shown in FIGS. 8A and 8B, the two connecting portions CNT are moved toward the center to make the rounding of the transfer signal uniform.

Although the second embodiment shows an example in which the signal path for transmitting one signal is separated into two branch paths and two connecting portion CNT are arranged, it may be set so that the signal path will be branched into three or more branch paths and three or more connecting portions CNT may be arranged.

Figure 9A:
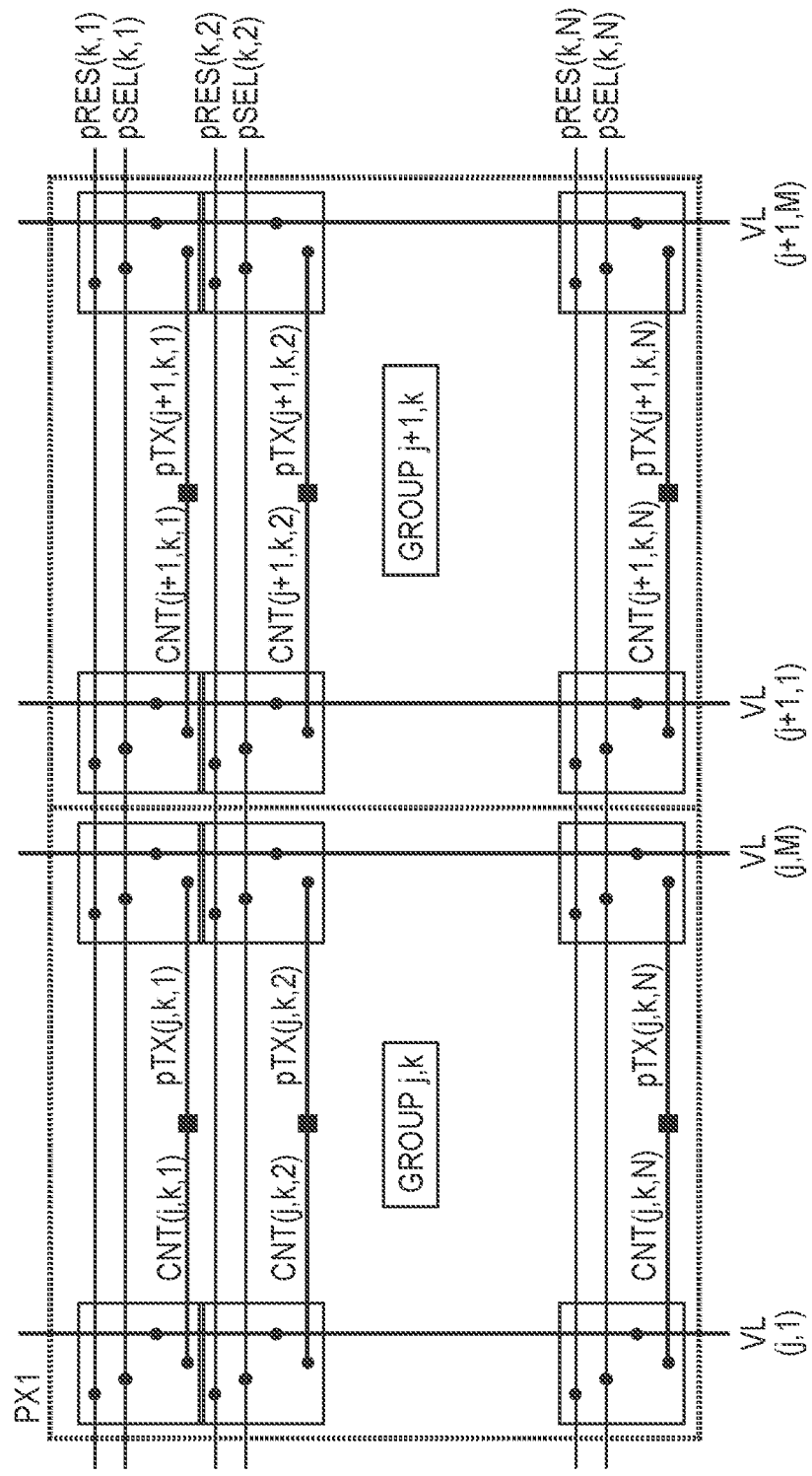
FIGS. 9A and 9B are plan views showing parts of the arrangement of a photoelectric conversion device according to the third embodiment of the present invention.
Figure 9B:
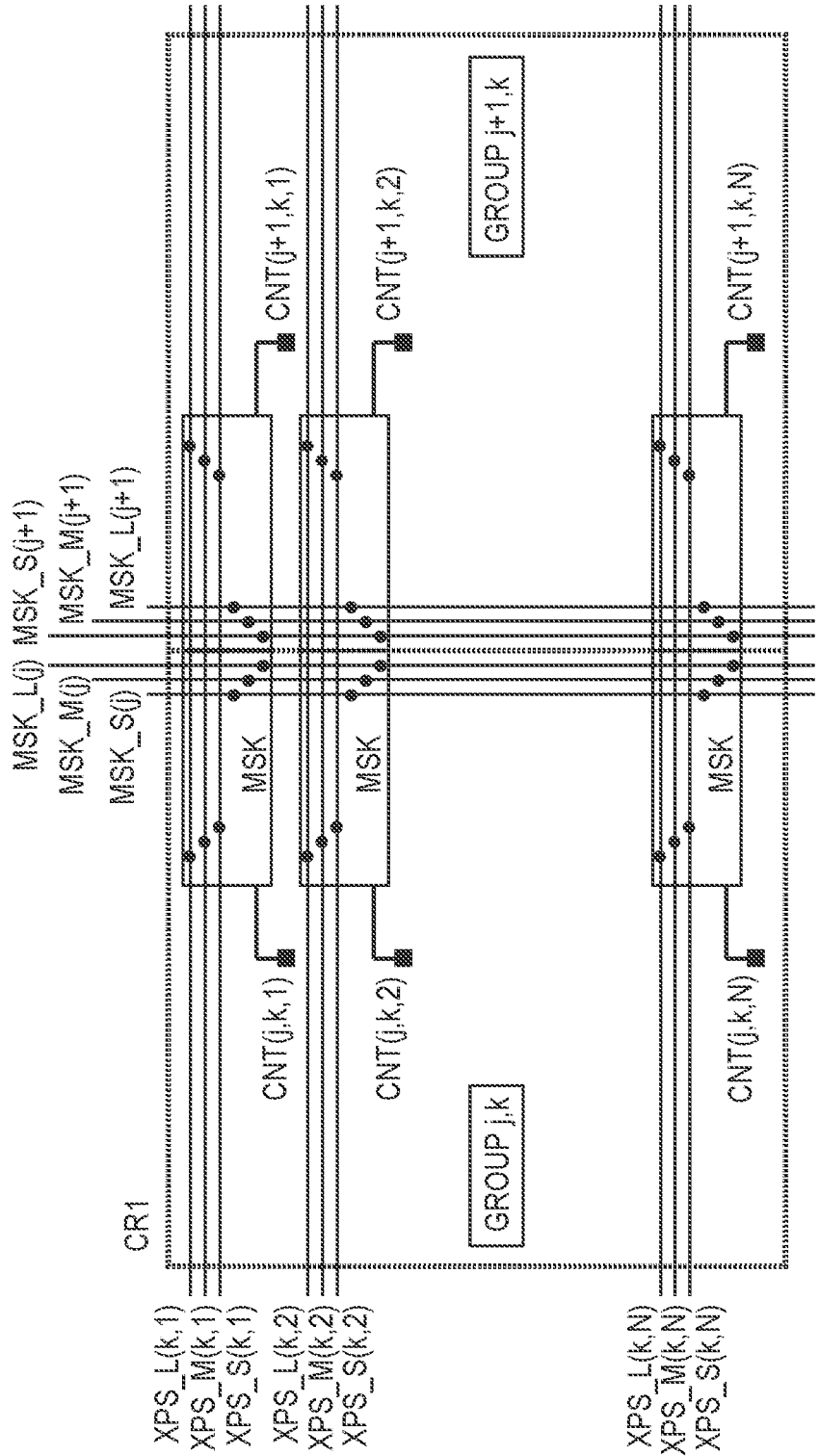

FIGS. 9A and 9B are views showing parts of the arrangement of a photoelectric conversion device 1 according to the third embodiment of the present invention. The third embodiment provides a modification of the first embodiment. Matters not mentioned in the third embodiment follow those described in the first embodiment. Each mask circuit MSK described above can be formed by a CMOS circuit. The CMOS circuit can be formed by PMOS transistor and an NMOS transistor, and a source and a drain can be formed after a well has been formed. If circuits that have different voltage amplitudes from each other are to be formed, a well can be formed for each circuit. Hence, each mask circuit MSK can include a plurality of wells. When the mask circuit MSK is individually arranged for each block 10(*n, k*), each well can become small. Thus, there is a possibility that the image quality will degrade due to changes in the potential of well by the influence of a surge or the like or that a large current capable of damaging an element will flow by a parasitic thyristor being set to ON.

Figure 10A:
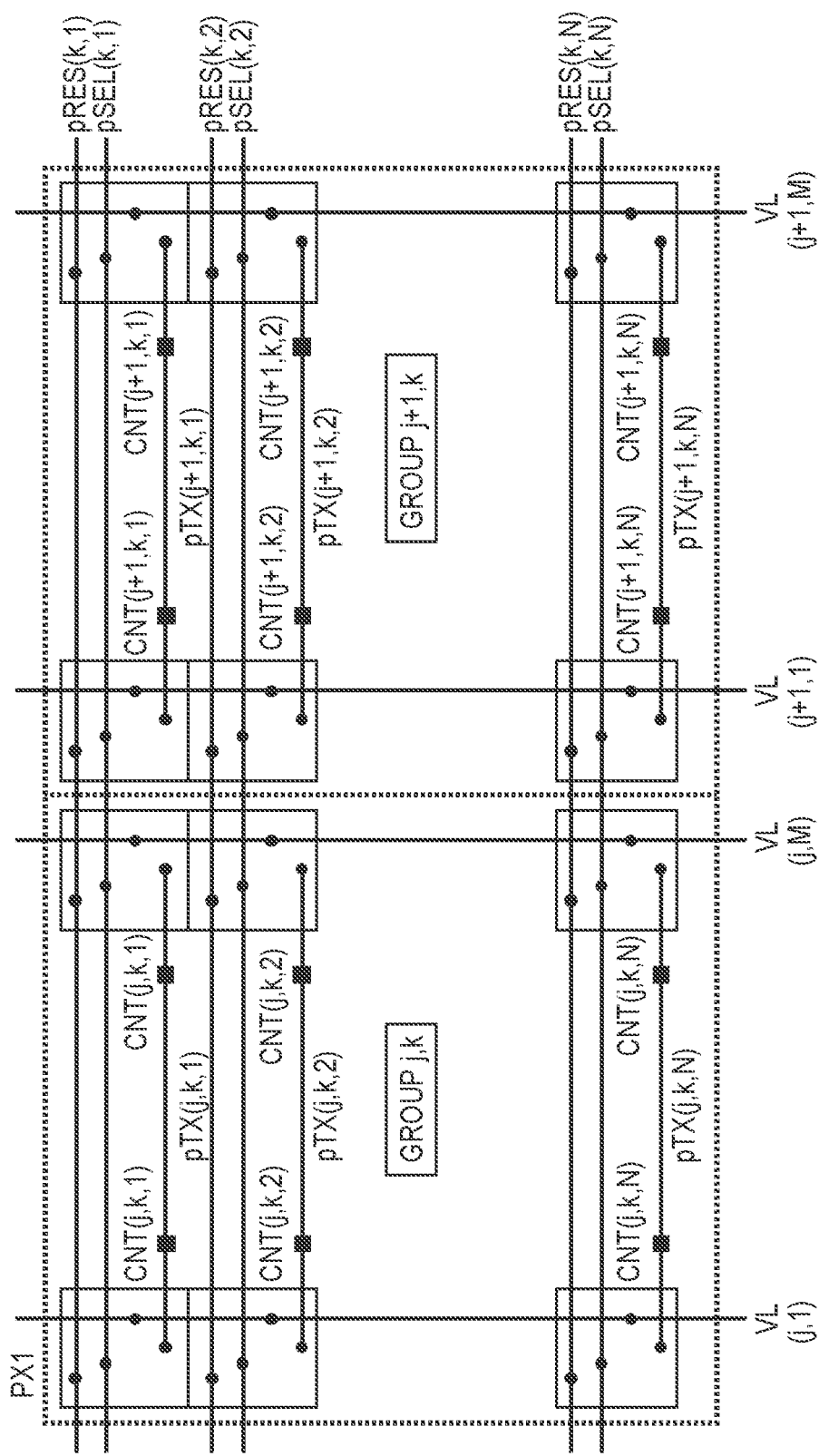
FIGS. 10A and 10B are plan views showing parts of the arrangement of a modification of the photoelectric conversion device according to the third embodiment of the present invention.
Figure 10B:
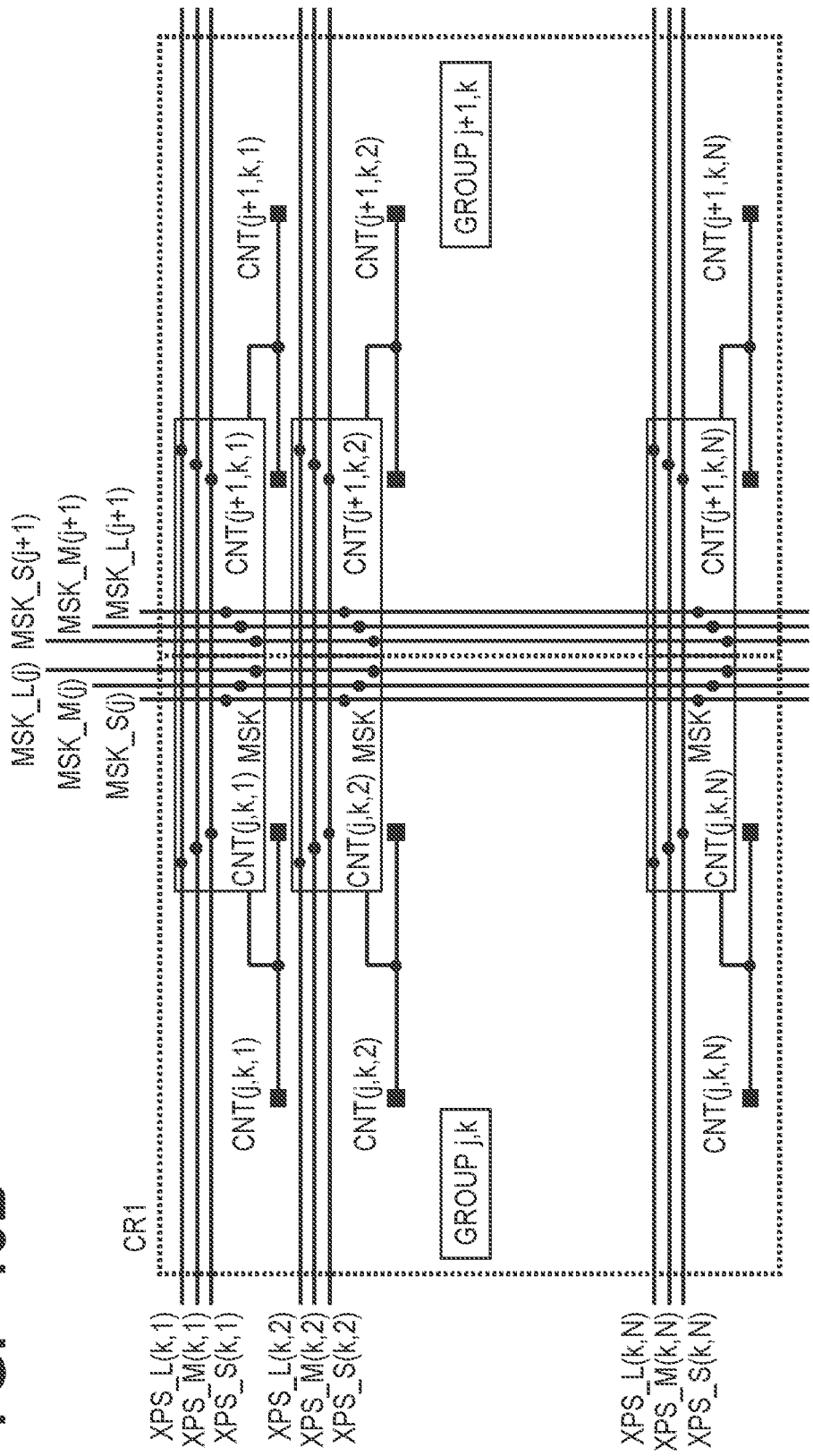

In the third embodiment shown in FIGS. 9A and 9B, each mask circuit MSK can be arranged in a folded layout with respect to a pair of adjacent blocks 10 in the row direction so that the size of each individual well can be increased and form wells that can cope with potential fluctuation. Furthermore, as shown in FIGS. 10A and 10B, the rounding of each driving pulse can be reduced effectively by combining the third embodiment and the second embodiment.

Although an arrangement in which each mask circuit MSK is formed to have a folded layout with respect to a pair of adjacent blocks 10 here, it may be arranged so that each mask circuit MSK will have a folded layout with respect to a pair of adjacent groups in the column direction. In addition, instead of a folded layout, the plurality of mask circuits MSK in a plurality of blocks 10 may be formed by using a common well.

Figure 11:
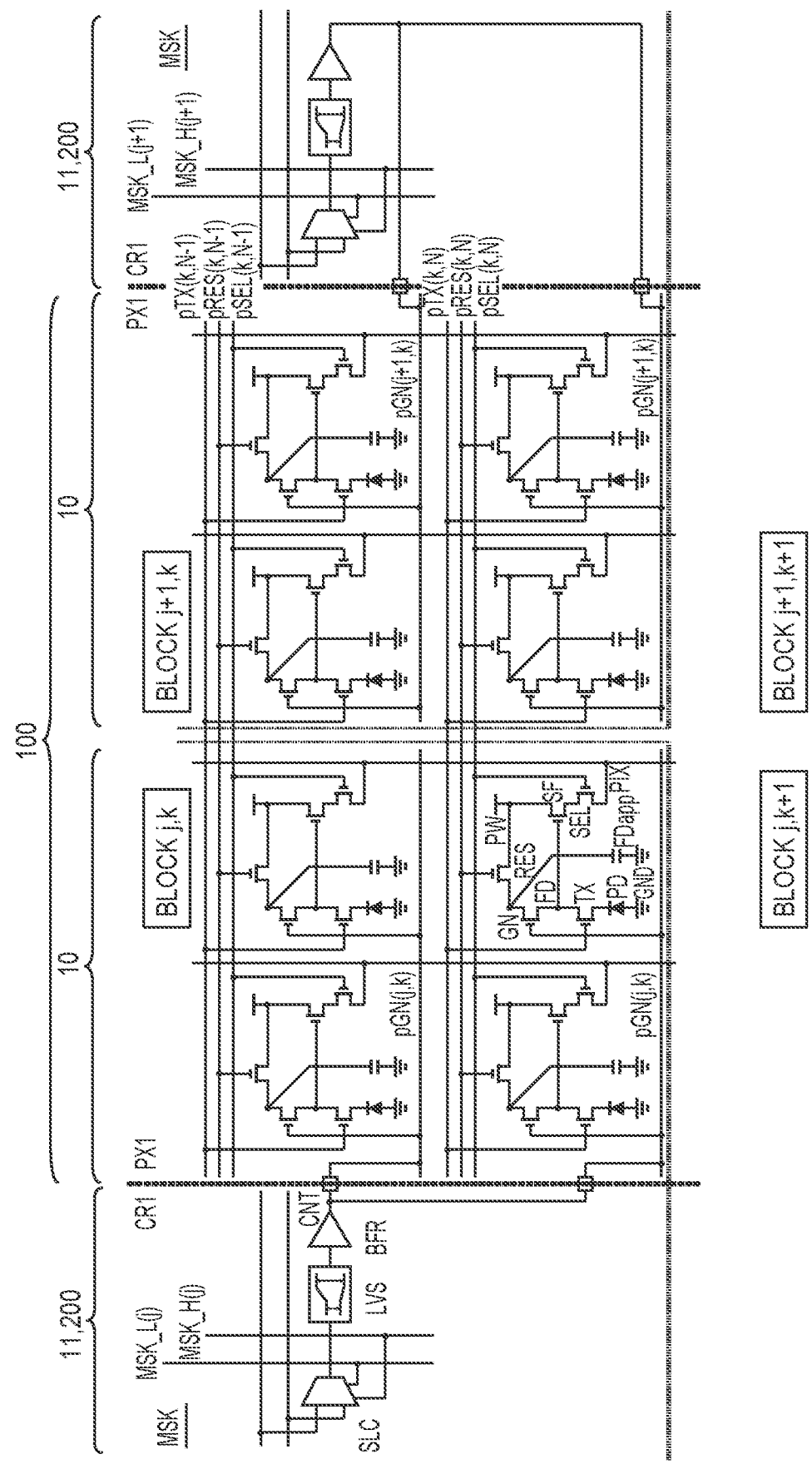
FIG. 11 is a view showing a partial arrangement of the arrangement of a photoelectric conversion device according to the fourth embodiment of the present invention.

FIG. 11 is a view showing a part of the arrangement of a photoelectric conversion device 1 according to the fourth embodiment of the present invention. Matters not mentioned in the fourth embodiment follow those described in any one of the first to third embodiments. The arrangement of each unit circuit (pixel) PIX according to the fourth embodiment differs from the arrangement of that exemplified in the first embodiment. Each unit circuit PIX exemplified in the fourth embodiment includes a load capacitance FDapp and a gain changing unit GN for changing the gain. In response to a gain setting signal line pGN (second signal line) being driven to the active level, the gain changing unit GN connects the load capacitance FDapp to a charge-voltage converter FD. This increases the capacitance of the input node of an amplifier SF and decrease the gain of the unit circuit PIX. A state in which the load capacitance FDapp is connected to the charge-voltage converter FD and the gain becomes low (low gain mode) is advantageous in improving the gradation. In contrast, in response to the gain setting signal line pGN (second signal line) being driven to the inactive level, the gain changing unit GN will cut off the load capacitance FDapp from the charge-voltage converter FD. This will reduce the capacitance of the input node of the amplifier SF and increase the gain of the unit circuit PIX. When the potential of the charge-voltage converter FD is to be reset by a reset unit RES, the gain changing unit GN is also set to the conductive state in addition to the reset unit RES. The switching of the gain is not limited to two stages, but may be executed at three or more stages.

In addition, in the fourth embodiment, the control target of each mask circuit MSK has been changed from the exposure time to the gain changing unit GN. However, it may be set so that two kinds of mask circuits will be arranged and both the exposure time and the gain changing unit GN will be controlled by the two kinds of mask circuits.

In the fourth embodiment, since a transfer signal line pTX need not be controlled for each row in each unit circuit PIX as in the manner the first embodiment, a single mask circuit MSK need to be arranged for a single block 10. As a result, a simpler arrangement can be used in the fourth embodiment to implement a function for individually controlling each block formed by a plurality of unit circuits.

Figure 12:
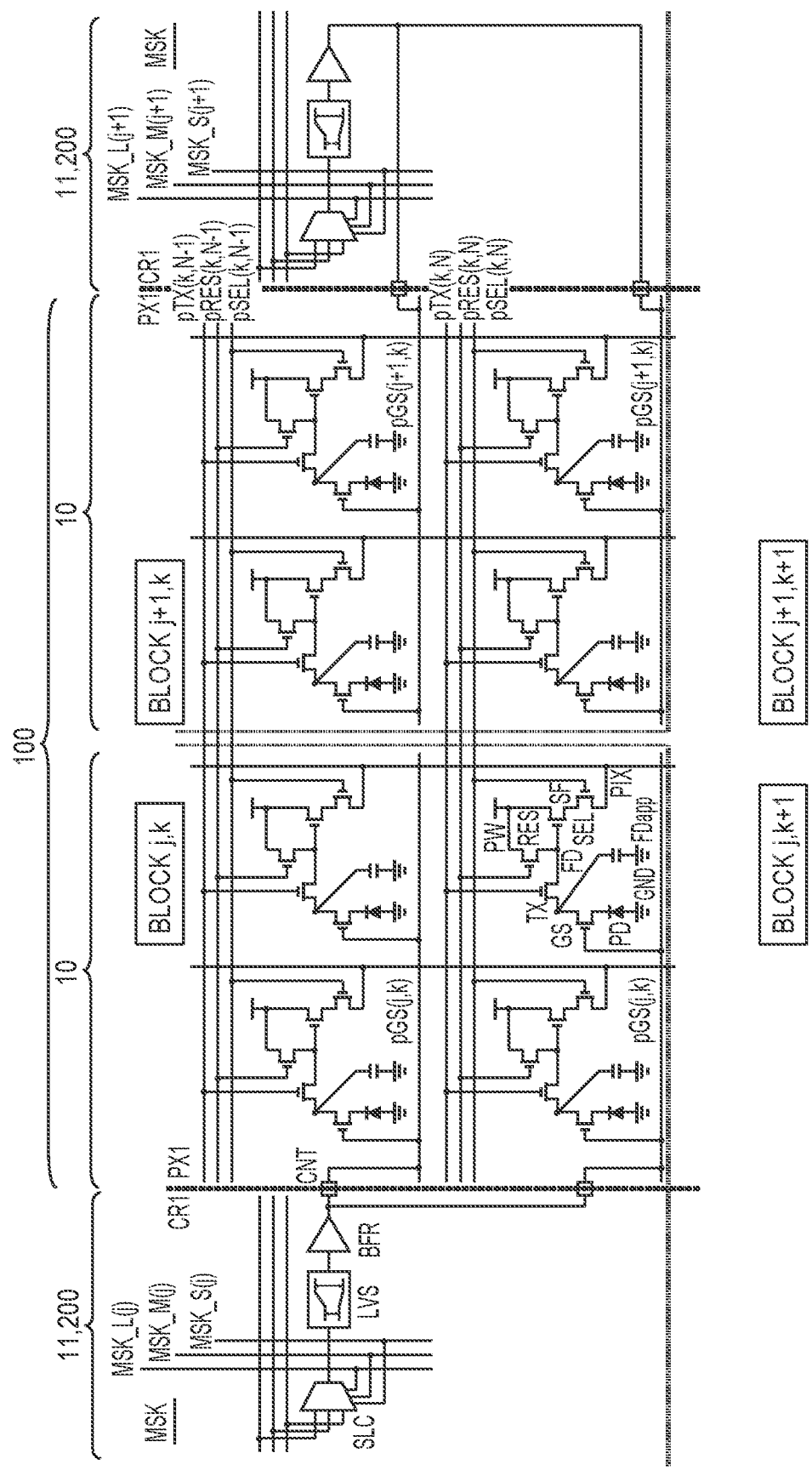
FIG. 12 is a view showing a partial arrangement of the arrangement of a photoelectric conversion device according to the fifth embodiment of the present invention.

FIG. 12 is a view showing a part of the arrangement of a photoelectric conversion device 1 according to the fifth embodiment of the present invention. Matters not mentioned in the fifth embodiment follow those described in any one of the first to fourth embodiments. In the fifth embodiment, each unit circuit (pixel) PIX has a global shutter function. More specifically, each unit circuit PIX according to the fifth embodiment has been obtained by adding a global shutter transistor GS and a holding unit ST to the unit circuit PIX exemplified in the first embodiment. In addition, in the fifth embodiment, the control target of each mask circuit MSK has been changed from a transfer signal line pTX to a shutter driving line pGS, and the exposure time is controlled for each block 10 by controlling the shutter driving line pGS.

In the fifth embodiment, charges are simultaneously transferred from photoelectric converters PD to the holding units ST in every row of the unit circuit array PX1 (in other words, in every unit circuit PIX of the unit circuit array PX1). Charges transferred to each holding unit ST and held by the holding unit ST are transferred to each charge-voltage converter FD by each transfer unit TX for each row, and a signal corresponding to the charges is read out for each row.

Although the transfer signal line pTX needs to be controlled for each row (and for each block 10) to control the exposure time in the first embodiment, the exposure time is controlled by each shutter driving line pGS in the fifth embodiment. Hence, in the fifth embodiment, the circuit arrangement can be simplified because only a single mask circuit MSK needs to be arranged for a single block 10. The fifth embodiment can also use a simpler arrangement to implement a function for individually controlling each block formed by a plurality of unit circuits.

Figure 13:
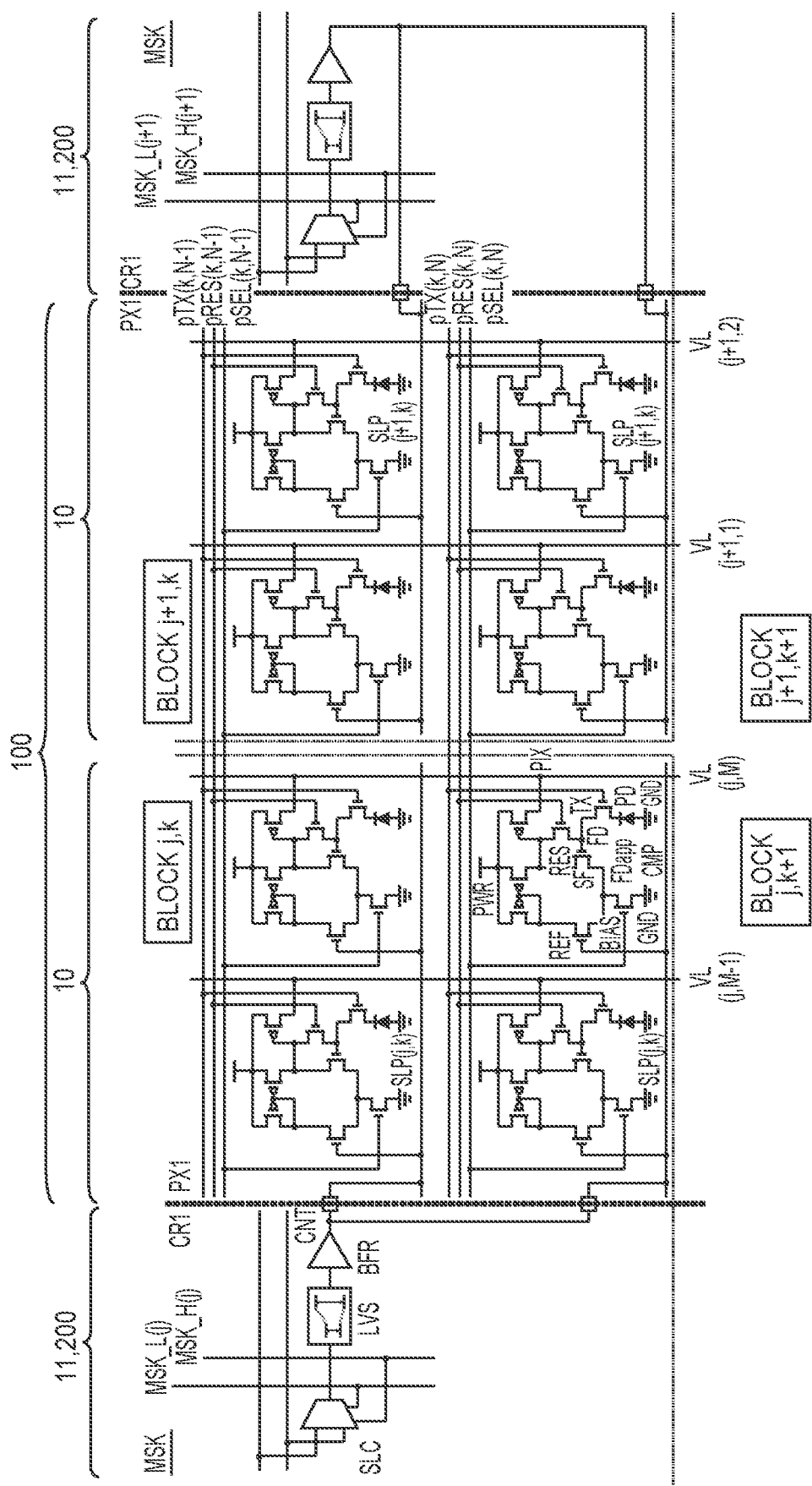
FIG. 13 is a view showing a partial arrangement of the arrangement of a photoelectric conversion device according to the sixth embodiment of the present invention.

FIG. 13 is a view showing a part of the arrangement of a photoelectric conversion device 1 according to the sixth embodiment of the present invention. Matters not mentioned in the sixth embodiment follow those described in any one of the first to fifth embodiments. In the sixth embodiment, each unit circuit (pixel) PIX includes a comparator circuit CMP that compares a signal generated by photoelectric conversion with a comparison signal SLP, and the comparison result obtained by the comparator circuit CMP is output to a corresponding vertical signal line VL. Also in the sixth embodiment, the control target of each mask circuit MSK has been changed from each transfer signal line pTX to each comparison signal line SLP. Each comparator circuit CMP can be formed by a differential amplifier circuit which is partially formed by an amplifier SF.

In each unit circuit PIX according to the sixth embodiment, a signal is output to the vertical signal line VL at low level when the voltage of the comparison signal SLP is higher than the voltage of a charge-voltage converter FD, and a signal is output to the vertical signal line VL at high level when the voltage of the comparison signal SLP is lower than the voltage of the charge-voltage converter FD. A ramp signal whose voltage gradually decreases for each unit time can be used as the comparison signal SLP to convert the voltage level of the charge-voltage converter FD into a digital signal value based on the time that the vertical signal line VL changes from low level to high level. A memory can be arranged in each unit circuit PIX, and the digital signal can be temporarily stored in the memory.

The conversion accuracy of converting a voltage level into a digital signal value can be changed by generating a plurality of ramp signals and changing the change amount for each unit time between the ramp signals. For example, in a case of a signal with a large change that can saturate the unit circuit PIX, a ramp signal that can execute digital signal value conversion in a shorter time can be selected although the conversion accuracy may degrade. By determining the ramp signal to be used for each block 10, it is possible to handle a voltage level of a wide dynamic range without prolonging the time required for the conversion.

The sixth embodiment can also use a simpler arrangement to implement a function for individually controlling each block formed by a plurality of unit circuits.

Figure 14A:
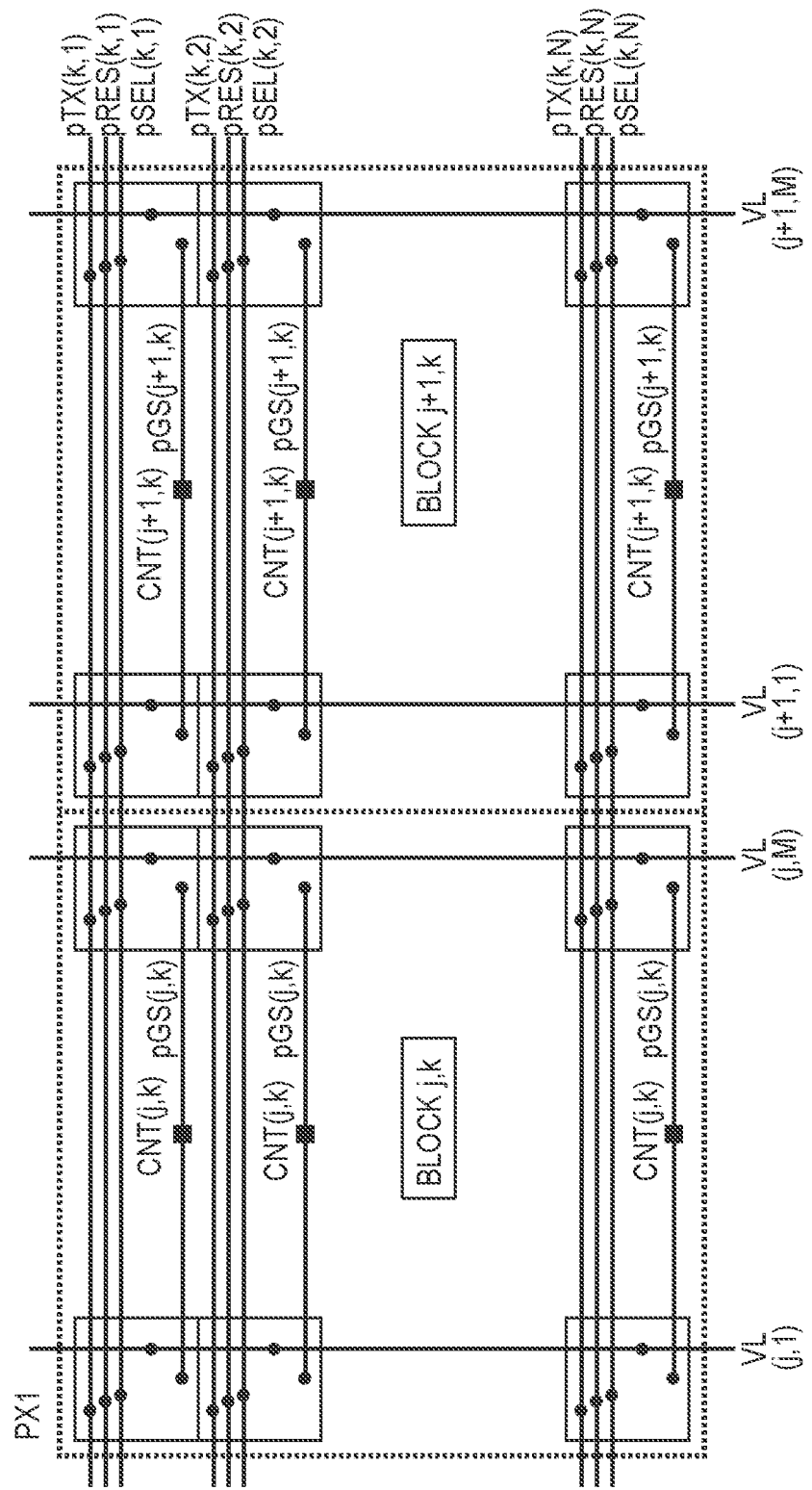
FIGS. 14A and 14B are views showing an example of the arrangement of a mask circuit.
Figure 14B:
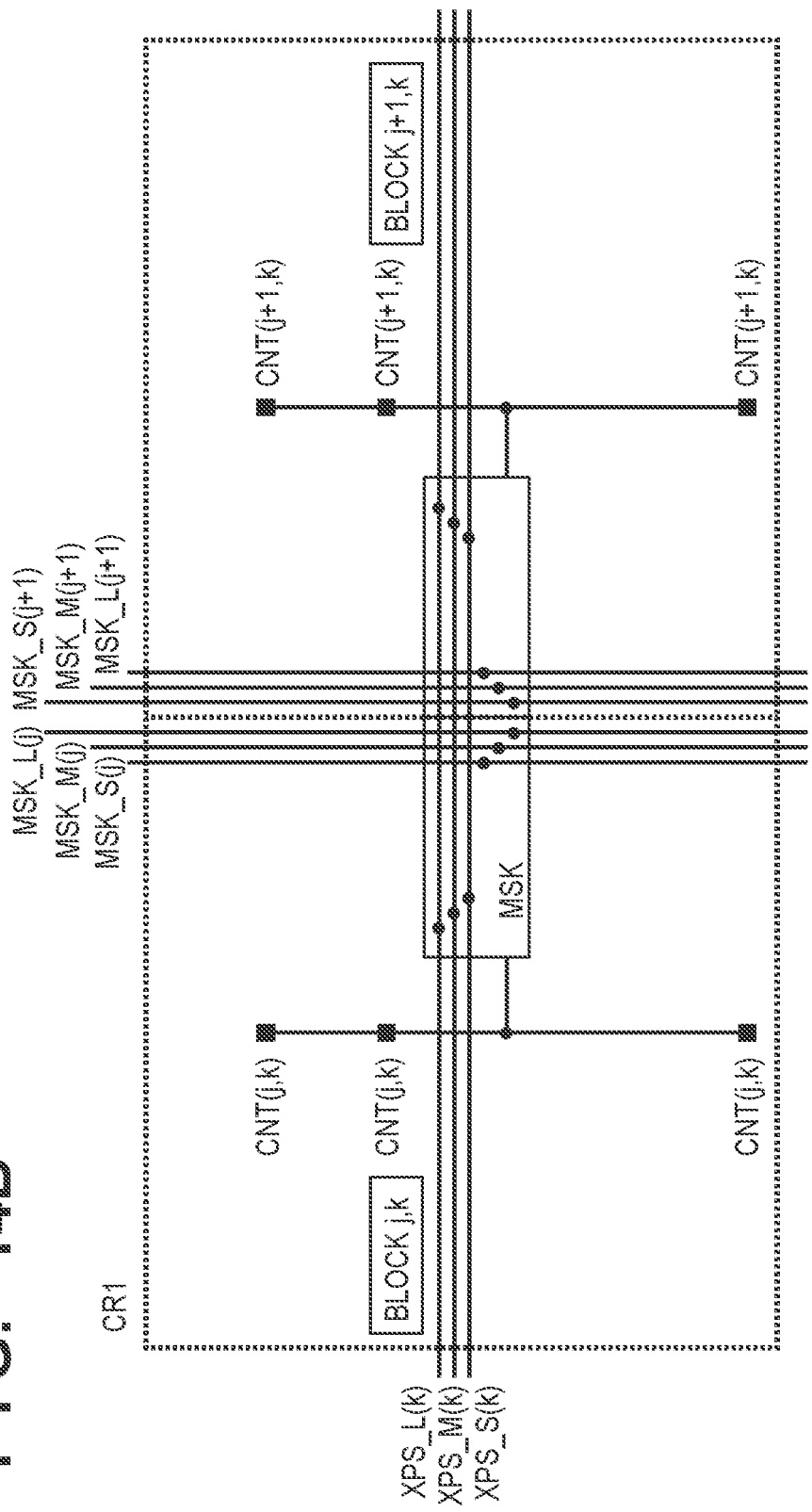
Figure 15A:
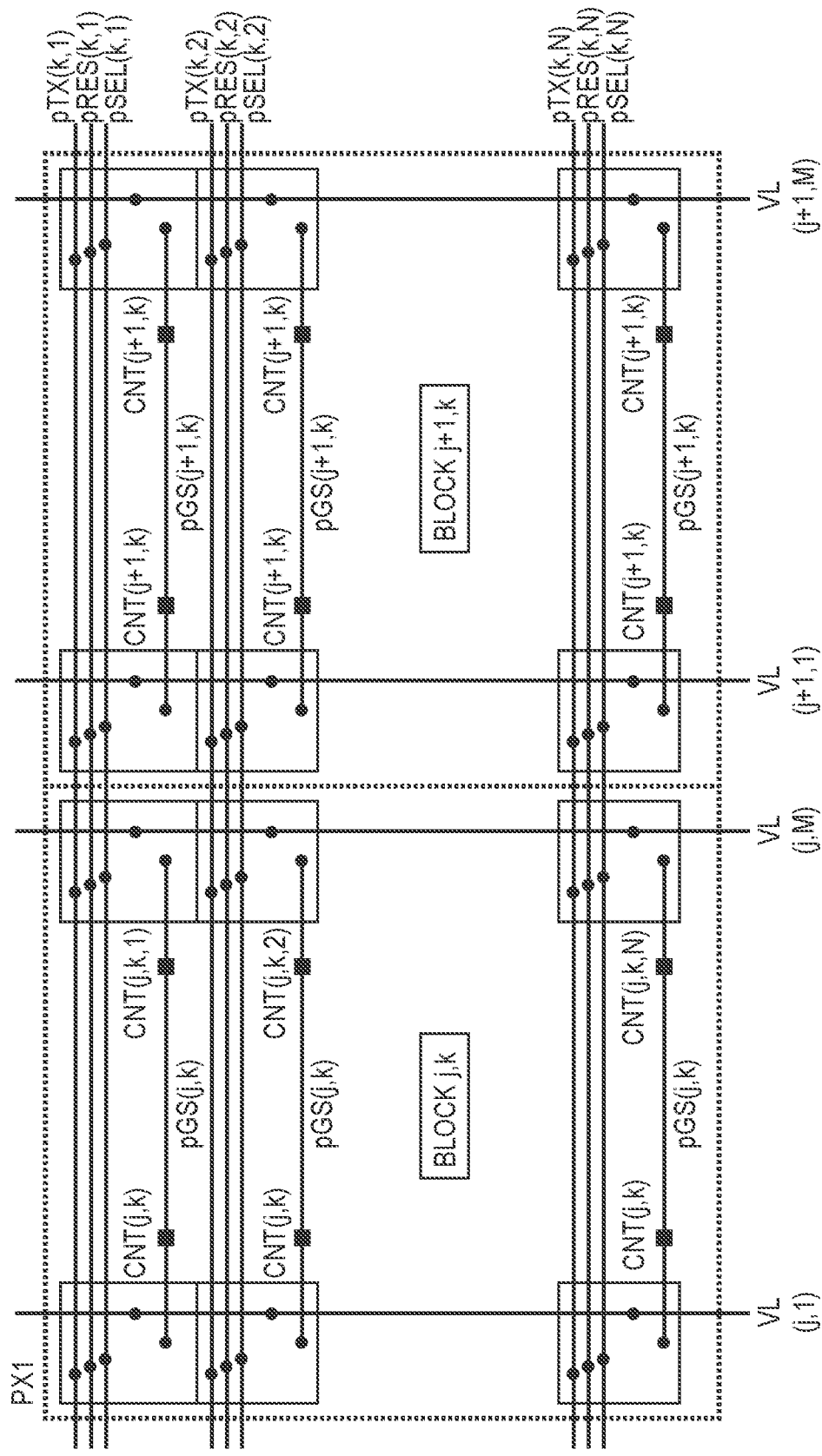

FIGS. 14A and 14B show an example in which one mask circuit MSK is arranged for one pair of blocks 10, and the mask circuit MSK is arranged in a folded layout with respect to a pair of adjacent blocks 10 in the row direction. FIGS. 15A and 15B show an example in which one mask circuit MSK is arranged for one set of blocks 10, and the mask circuit MSK is arranged in a folded layout with respect to a set of adjacent blocks 10 in the row direction and the column direction.

Figure 16:
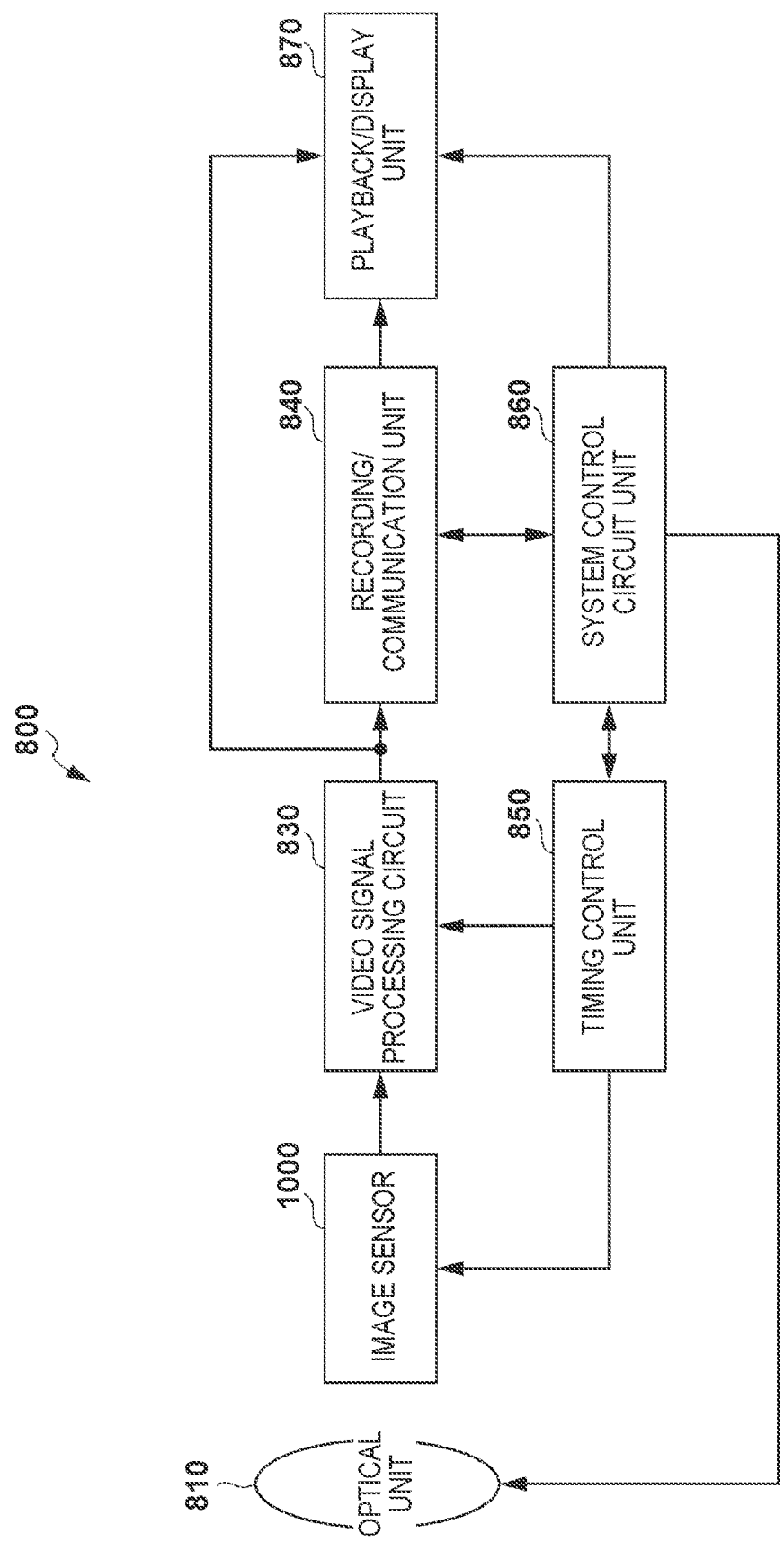
FIG. 16 is a block diagram showing an example of the arrangement of an image sensing system.

An image sensing system according to an embodiment of the present invention will be described next with reference to FIG. 16. An image sensing system 800 includes, for example, an optical unit 810, an image sensor 1000, a video signal processing circuit 830, a recording/communication unit 840, a timing control unit 850, a system control circuit unit 860, and a playback/display unit 870. The image sensor 1000 is a solid-state image sensor in which a photoelectric conversion device 1 described in the above embodiments has been applied.

The optical unit 810 which is an optical system such as a lens forms an image of an object by forming the light from the object on a pixel array, on which a plurality of pixels are two-dimensionally arranged, of the image sensor 1000. The image sensor 1000 outputs a signal corresponding to the light, which has been formed into an image on the pixel unit, at a timing based on a signal from the timing control unit 850.

The signal output from the image sensor 1000 is input to the video signal processing circuit 830 which is a video signal processor, and the video signal processing circuit 830 performs processing such as AD conversion on the input electrical signal in accordance with the method determined by a program or the like. The signal obtained in accordance with processing by the video signal processing circuit is transmitted as image data to the recording/communication unit 840. The recording/communication unit 840 transmits the image formation signal to the playback/display unit 870 and causes the playback/display unit 870 to playback/display a moving image or a still image. The recording/communication unit also communicates with the system control circuit unit 860 upon receiving a signal from the video signal processing circuit 830 (processor), and also executes an operation to record the image formation signal in a recording medium (not shown).

The system control circuit unit 860 is a unit for generally controlling the operation of the image sensing system, and controls the driving operations of the optical unit 810, the timing control unit 850, the recording/communication unit 840, and the playback/display unit 870. The system control circuit unit 860 also includes, for example, a storage device (not shown) serving as a recording medium, and programs necessary for controlling operation of the image sensing system is stored in this storage device. The system control circuit unit 860 also supplies, for example, a signal for switching the driving mode in accordance with an operation performed by a user into the image sensing system. As a more specific example, the signal may be a signal to change the readout row or a row to be reset, a signal to change an angle of view in accordance with an electronic zoom, a signal to shift the angle of view in accordance with an electronic anti-vibration operation.

The timing control unit 850 controls the driving timings of the image sensor 1000 and the video signal processing circuit 830 based on the control by the system control circuit unit 860 serving as the control unit.

Figure 17A:
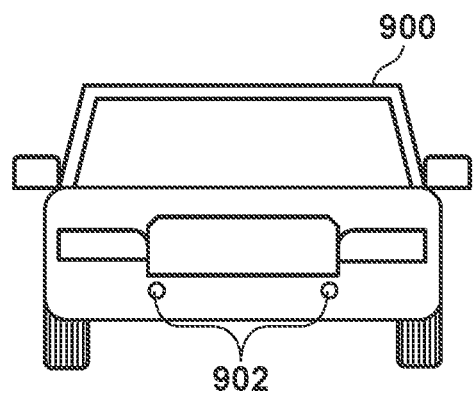
FIGS. 17A to 17C are views showing a moving body according to an embodiment of the present invention.
Figure 17B:
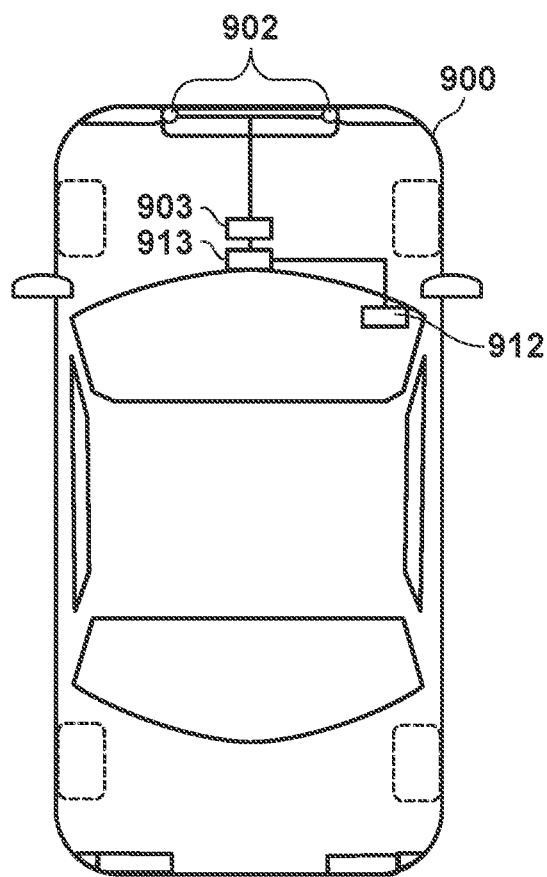
Figure 17C:
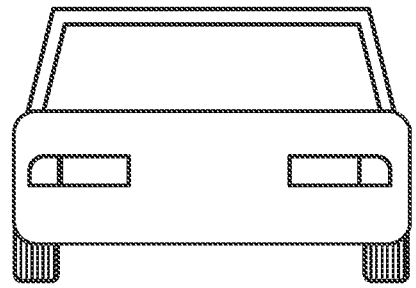

FIGS. 17A to 17C show the arrangement of an automobile 900 as an example of a movable apparatus incorporating an image sensor according to the embodiments described above. FIG. 17A schematically shows the automobile 900 viewed from the front side, FIG. 17B schematically shows the automobile 900 viewed from above, and FIG. 17C schematically shows the automobile 900 viewed from the rear side. The automobile 900 includes an image sensor 902 in which the photoelectric conversion device 1 described in the above embodiments has been applied. The automobile 900 also includes an ASIC (Application Specific Integrated Circuit) 903, a warning device 912, and a main control unit 913.

Upon receiving a signal representing an abnormality from the image sensor 902, a vehicle sensor, a control unit, or the like, the warning device 912 gives a warning to the driver. The main control unit 913 generally controls the operations of the image sensor 902, the vehicle sensor, the control unit, and the like. Note that the automobile 900 need not always include the main control unit 913. In this case, the image sensor 902, the vehicle sensor, or the control unit transmits/receives a control signal via a communication network (for example, CAN standard).

Figure 18:
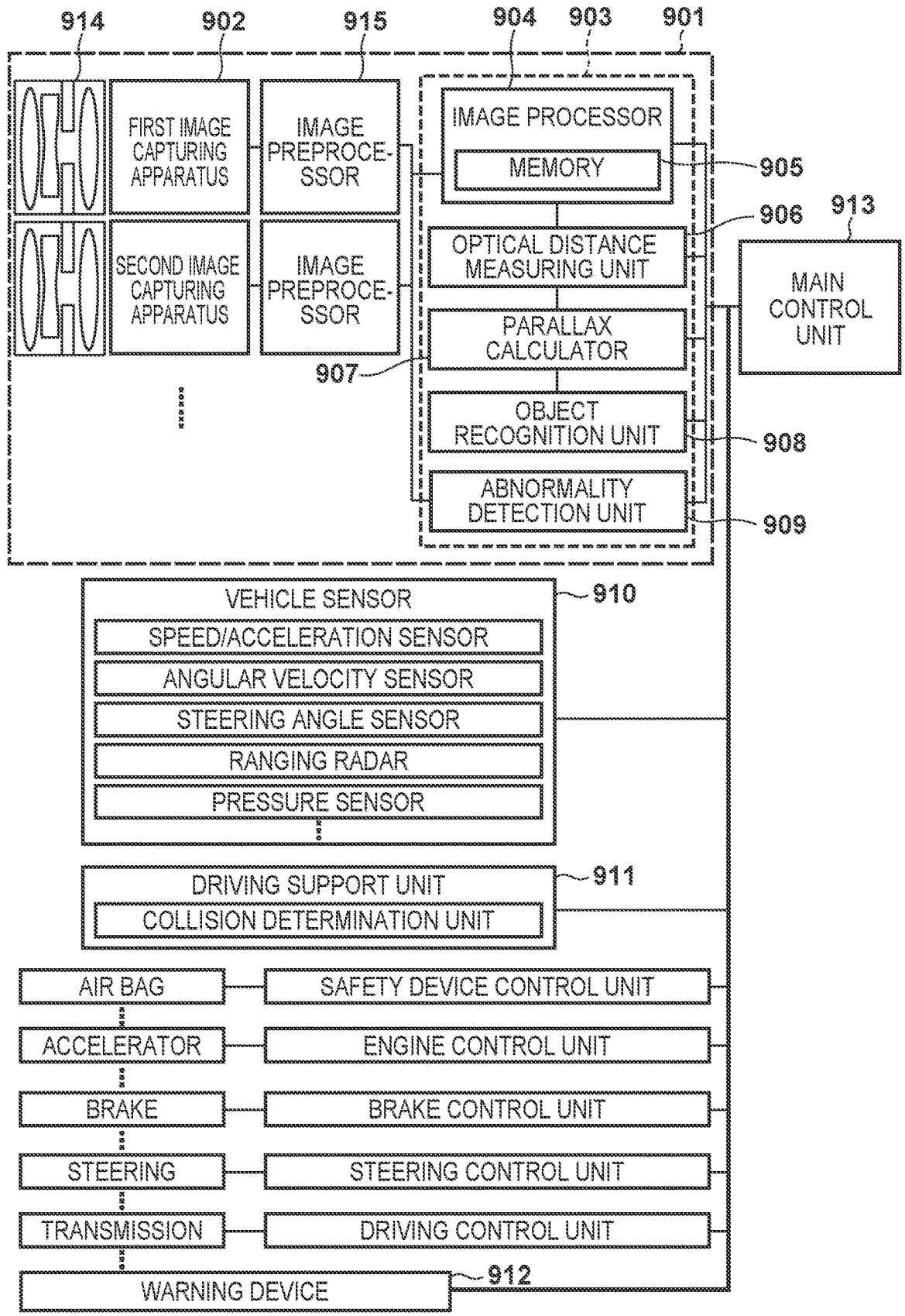
FIG. 18 is a block diagram showing the moving body according to the embodiment of the present invention.

FIG. 18 is a block diagram showing the system arrangement of the automobile 900. The automobile 900 includes the first image sensor 902 and the second image sensor 902. A stereo camera is formed by the first image sensor 902 and the second image sensor 902. An object image is formed on the image sensor 902 by an optical unit 914. A pixel signal output from the image sensor 902 is processed by an image preprocessor 915 and transmitted to the ASIC 903. The image preprocessor 915 performs calculation of obtaining the difference between the optical signal VS and the noise signal VN or processing such as synchronization signal addition.

The ASIC 903 can include an image processor 904, an optical distance measuring unit 906, a parallax calculator 907, an object recognition unit 908, and an abnormality detection unit 909. The image processor 904 processes the pixel signal to generate an image signal. The image processor 904 also performs correction of an image signal or defect completion. The image processor 904 includes a memory 905 that temporarily holds the image signal. The memory 905 may store the position of a known defective pixel of the image sensor 902. The above-described calculator 20 may be provided in the image processor 904.

The optical distance measuring unit 906 performs focusing or distance measurement of the object using the image signal. The parallax calculator 907 performs object collation (stereo matching) of a parallax image. The object recognition unit 908 analyzes the image signal and recognizes objects such as an automobile, a person, a sign, and a road.

The abnormality detection unit 909 detects a fault or an operation error of the image sensor 902. Upon detecting a fault or an operation error, the abnormality detection unit 909 sends a signal representing detection of the abnormality to the main control unit 913. The abnormality detection unit 909 may have the function of the above-described calculator 20.

The automobile 900 includes a vehicle sensor 910 and a driving support unit 911. The vehicle sensor 910 can include a speed/acceleration sensor, an angular velocity sensor, a steering angle sensor, a ranging radar, and a pressure sensor.

The driving support unit 911 includes a collision determination unit. The collision determination unit determines, based on pieces of information from the optical distance measuring unit 906, the parallax calculator 907, and the object recognition unit 908, whether there is possibility of collision against an object. The optical distance measuring unit 906 and the parallax calculator 907 are examples of a distance information acquisition means for acquiring distance information to a target. That is, the distance information is information about a parallax, a defocus amount, and a distance up to the target. The collision determination unit may determine the collision possibility using one of these pieces of distance information. The distance information acquisition means may be implemented by hardware designed for a special purpose or may be implemented by a software module.

An example in which the driving support unit 911 controls the automobile 900 so it does not collide against another object has been described. However, it is also applicable to control of automatic driving following another vehicle or control of automatic driving not to drive off a lane.

The automobile 900 also includes driving units used for driving such as an air bag, an accelerator, a brake, steering, and a transmission. The automobile 900 also includes control units for these units. Each control unit controls a corresponding driving unit based on a control signal of the main control unit 913.

When performing driving support or automatic driving by mounting, in the automobile 900, the image sensing apparatus or the image sensing system according to the present invention, as described above, a plurality of image sensing apparatuses or image sensing systems can be used. At this time, if a characteristic of an element in the temperature signal output unit changes between the image sensing apparatuses or image sensing systems, an assumed temperature changes between the image sensing apparatuses, and it may be impossible to normally perform driving support or automatic driving. In addition, since driving support or automatic driving of the automobile 900 requires correctness, the accuracy required for temperature measurement is also high.

When the image sensing apparatus or image sensing system according to the present invention is used, the accuracy of temperature measurement can be improved, and the correctness of driving support or automatic driving can be increased.

The image sensing system used in the embodiments is applicable not only to an automobile but also to, for example, a moving object (a movable apparatus) such as a ship, an airplane, or an industrial robot. The image sensing system is also applicable not only to a moving object but also widely to a device using object recognition such as an ITS (Intelligent Transportation System).

According to the present invention, a technique advantageous in implementing a function for individually controlling each block formed by a plurality of unit circuits in a simpler arrangement is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-178080, filed Sep. 21, 2018, which is hereby incorporated by reference herein in its entirety.

What is claimed is:
1. A photoelectric conversion device comprising:
   a first substrate in which a plurality of blocks each including a plurality of photoelectric converters are arranged so as to form a plurality of columns and a plurality of rows; and a second substrate in which at least a part of a processing circuit for reading out signals from the plurality of photoelectric converters of each of the plurality of blocks is arranged, wherein the processing circuit is configured to drive a plurality of driving signal lines for driving the plurality of photoelectric converters of each of the plurality of blocks, wherein the plurality of driving signal lines include (a) a plurality of first signal lines each arranged in the first substrate and assigned in common, to at least two blocks arranged in a row direction of the plurality of blocks and (b) a plurality of second signal lines each individually assigned to one block of the plurality of blocks, wherein the processing circuit includes (a) a plurality of transmission lines, and (b) a plurality of mask circuits each connected to the plurality of transmission lines and a corresponding second signal line of the plurality of second signal lines, and not connected to any of the plurality of first signal lines, wherein each of the plurality of mask circuits is configured to drive a corresponding second signal line of the plurality of second signal lines based on a signal selected from a plurality of signals supplied to the plurality of transmission lines, and wherein each of the plurality of mask circuits includes (a) a selection circuit configured to select a signal from the plurality of signals, and (b) a voltage amplitude converter circuit configured to receive and amplify an output of the selection circuit.

2. The device according to claim 1, wherein each of the plurality of mask circuits further includes a buffer configured to receive an output of the voltage amplitude converter and to drive the corresponding second signal line.

3. The device according to claim 1, wherein the plurality of mask circuits are arranged to form a plurality of rows and a plurality of columns, wherein a plurality of selection signal lines are provided to each of the plurality of columns of the plurality of mask circuits to control them, wherein the plurality of transmission lines extend in a direction in which each of the plurality of rows extends, and wherein the plurality of selection signal lines extend in a direction in which each of the plurality of columns extends.

4. The device according to claim 1, wherein the plurality of blocks each include a plurality of unit circuits, wherein each unit circuit includes (a) a photoelectric converter, (b) a charge-voltage converter, and (c) a transfer unit configured to transfer charges from the photoelectric converter to the charge-voltage converter, and wherein each of the second signal lines includes a transfer signal line configured to drive the transfer unit.

5. The device according to claim 1, wherein the plurality of transmission lines include a plurality of exposure time signals which provide exposure times different from each other.

6. An image sensing system comprising:
a photoelectric conversion device according to claim 1; and
a processor configured to process a signal output from the photoelectric conversion device.

7. A moving body comprising:
an image sensing system according to claim 6; and an integrated circuit configured to process a signal output from the image sensing system.

8. A photoelectric conversion device comprising:
a first substrate in which a plurality of blocks each including a plurality of photoelectric converters are arranged so as to form a plurality of columns and a plurality of rows; and
a second substrate in which at least a part of a processing circuit for reading out signals from the plurality of photoelectric converters of each of the plurality of blocks is arranged, wherein the processing circuit is configured to drive a plurality of driving signal lines for driving the plurality of photoelectric converters of each of the plurality of blocks, wherein the plurality of driving signal lines include (a) a plurality of first signal lines each arranged in the first substrate and assigned in common, to at least two blocks arranged in a row direction of the plurality of blocks and (b) a plurality of second signal lines each individually assigned to one block of the plurality of blocks, wherein the processing circuit includes (a) a plurality of transmission lines, and (b) a plurality of mask circuits each corresponding to one second signal line of the plurality of second signal lines, wherein each of the plurality of mask circuits is configured to drive a corresponding second signal line of the plurality of second signal lines based on a signal selected from a plurality of signals supplied to the plurality of transmission lines, and wherein two of the plurality of mask circuits are arranged between each pair of adjacent two blocks of the plurality of blocks in a folded layout.

9. The device according to claim 8, wherein each of the plurality of mask circuits includes (a) a selection circuit configured to select one driving signal from the plurality of signals, and (b) a voltage amplitude converter circuit configured to receive and amplify an output of the selection circuit.

10. The device according to claim 9, wherein each of the plurality of mask circuits further includes a buffer configured to receive an output of the voltage amplitude converter and to drive the corresponding second signal line.

11. The device according to claim 8, wherein the plurality of mask circuits are arranged to form a plurality of row and a plurality of columns, wherein a plurality of selection signal lines are provided to each of the plurality of columns of the plurality of mask circuits to control them, wherein the plurality of transmission lines extend in a direction in which each of the plurality of rows extends, and wherein the plurality of selection signal lines extend in a direction in which each of the plurality of columns extends.

12. The device according to claim 8, wherein the plurality of blocks each include a plurality of unit circuits, wherein each unit circuit includes (a) a photoelectric converter, (b) a charge-voltage converter, and (c) a transfer unit configured to transfer charges from the photoelectric converter to the charge-voltage converter, and wherein each of the second signal lines includes a transfer signal line configured to drive the transfer unit.

13. The device according to claim 8, wherein the plurality of transmission lines include a plurality of exposure time signals which provide exposure times different from each other.

14. An image sensing system comprising:
a photoelectric conversion device according to claim 8; and
a processor configured to process a signal output from the photoelectric conversion device.

15. A moving body comprising:
an image sensing system according to claim 14; and
an integrated circuit configured to process a signal output from the image sensing system.

16. A photoelectric conversion device comprising:
a first substrate in which a plurality of blocks each including a plurality of pixels are arranged so as to form a plurality of columns and a plurality of rows, each pixel including (a) a photoelectric converter and (b) a transistor having a gate, a control signal line being arranged to extend in a first direction and configured to supply a control signal to the gate of the transistor of each pixel arranged in the same row; and
a second substrate in which at least a part of a processing circuit for reading out signals from the plurality of photoelectric converters of each of the plurality of blocks is arranged,
wherein the processing circuit is configured to drive a plurality of driving signal lines for driving the plurality of photoelectric converters of each of the plurality of blocks,
wherein the plurality of driving signal lines include (a) a plurality of first signal lines each arranged in the first substrate and assigned in common, to at least two blocks arranged in a row direction of the plurality of blocks and (b) a plurality of second signal lines each individually assigned to one block of the plurality of blocks to control exposure time of the one block,
wherein the processing circuit includes a plurality of mask circuits arranged so as to form a plurality of columns and a plurality of rows,
wherein a plurality of exposure time signal lines are provided to each of the plurality of rows of the plurality of mask circuits that provide exposure times different from each other,
wherein a plurality of exposure time selection signal lines extending in a second direction intersecting the first direction in a plan view are provided to each of the plurality of columns of the plurality of mask circuits, and
wherein each mask circuit of the plurality of mask circuits is configured to drive a corresponding second signal line of the plurality of second signal lines in accordance with a signal on an exposure time signal line selected from the plurality of exposure time signal lines provided to the mask circuit based on signals on the plurality of exposure time selection signal lines provided to the mask circuit.

17. The device according to claim 16, wherein each of the plurality of mask circuits includes (a) a selection circuit configured to select a signal from a plurality of exposure time selection signals supplied to the plurality of exposure time selection signal lines, and (b) a voltage amplitude converter circuit configured to receive and amplify an output of the selection circuit.

18. The device according to claim 17, wherein each of the plurality of mask circuits further includes a buffer configured to receive an output of the voltage amplitude converter and to drive the corresponding second signal line.

19. The device according to claim 16, wherein the plurality of exposure time signal lines extend in a direction in which each of the plurality of rows extends, and
wherein the plurality of exposure time selection signal lines extend in a direction in which each of the plurality of columns extends.

20. The device according to claim 16, wherein the plurality of blocks each include a plurality of unit circuits,
wherein each unit circuit includes (a) a photoelectric converter, (b) a charge-voltage converter, and (c) a transfer unit configured to transfer charges from the photoelectric converter to the charge-voltage converter, and
wherein each of the second signal lines includes a transfer signal line configured to drive the transfer unit.

21. An image sensing system comprising:
a photoelectric conversion device according to claim 16; and
a processor configured to process a signal output from the photoelectric conversion device.

22. A moving body comprising:
an image sensing system according to claim 21; and
an integrated circuit configured to process a signal output from the image sensing system.

* * * * *